United States Patent
Tsatsanis et al.

(10) Patent No.: US 10,826,728 B2
(45) Date of Patent: Nov. 3, 2020

(54) LOCALIZED EQUALIZATION FOR CHANNELS WITH INTERCARRIER INTERFERENCE

(71) Applicant: Cohere Technologies, Inc., Santa Clara, CA (US)

(72) Inventors: Michail Tsatsanis, Santa Clara, CA (US); Christian Ibars Casas, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/324,102

(22) PCT Filed: Aug. 14, 2017

(86) PCT No.: PCT/US2017/046817
§ 371 (c)(1),
(2) Date: Feb. 7, 2019

(87) PCT Pub. No.: WO2018/032016
PCT Pub. Date: Feb. 15, 2018

(65) Prior Publication Data
US 2020/0186397 A1    Jun. 11, 2020

Related U.S. Application Data

(60) Provisional application No. 62/374,543, filed on Aug. 12, 2016.

(51) Int. Cl.
*H04L 5/00* (2006.01)
*H04L 25/03* (2006.01)
(Continued)

(52) U.S. Cl.
CPC ...... *H04L 25/03159* (2013.01); *H04L 5/0007* (2013.01); *H04L 25/0204* (2013.01);
(Continued)

(58) Field of Classification Search
CPC . H04L 27/2639; H04L 27/265; H04L 5/0016; H04L 5/0048; H04L 5/0007;
(Continued)

(56) References Cited

U.S. PATENT DOCUMENTS

| | | |
|---|---|---|
| 4,754,493 A | 6/1988 | Coates |
| 5,083,135 A | 1/1992 | Nagy et al. |

(Continued)

FOREIGN PATENT DOCUMENTS

| | | |
|---|---|---|
| CN | 1235720 A | 11/1999 |
| CN | 101682316 A | 3/2010 |

(Continued)

OTHER PUBLICATIONS

International Search Report and Written Opinion for International Application No. PCT/US2017/025797, dated Jun. 21, 2017, 6 pages.

(Continued)

*Primary Examiner* — Rahel Guarino
(74) *Attorney, Agent, or Firm* — Perkins Coie LLP

(57) ABSTRACT

A wireless communication method for receiving an orthogonal time frequency space (OTFS) modulated signal includes receiving the OTFS signal over a wireless communication channel, dividing the receiving OTFS signal along a delay-dimension into a plurality of segments, performing, for each segment, channel estimation independent of channel estimation for other segments to generate a plurality of channel estimates, performing, for each segment, channel equalization using a corresponding channel estimate from the plurality of channel estimates to generate a channel-equalized symbol stream, and generating information bits from the channel-equalized symbol stream.

20 Claims, 26 Drawing Sheets

(51) Int. Cl.
*H04L 25/02* (2006.01)
*H04L 27/26* (2006.01)

(52) U.S. Cl.
CPC .... *H04L 25/03292* (2013.01); *H04L 27/2647* (2013.01); *H04L 2025/03649* (2013.01)

(58) Field of Classification Search
CPC .............. H04L 27/2647; H04L 27/26; H04L 25/03159; H04L 25/03286; H04L 25/0204; H04L 25/03292; H04L 27/2601; H04L 27/01; H04L 27/2672; H04L 5/0026; Y02D 70/1262
See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0163202 A1 | 7/2005 | Hampel et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0153834 A1 | 7/2007 | Qu et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2007/0293256 A1 | 12/2007 | Merched et al. |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0052566 A1 | 2/2009 | Maltsev et al. |
| 2009/0067514 A1 | 3/2009 | Stojanovic |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0135019 A1 | 6/2011 | Zhang et al. |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |

(56) References Cited

U.S. PATENT DOCUMENTS

| | | | |
|---|---|---|---|
| 2013/0260787 A1 | 10/2013 | Hashimoto | |
| 2013/0279627 A1 | 10/2013 | Wu et al. | |
| 2013/0315133 A1 | 11/2013 | Wang et al. | |
| 2014/0143639 A1 | 5/2014 | Loghin et al. | |
| 2014/0161154 A1 | 6/2014 | Hadani et al. | |
| 2014/0169385 A1 | 6/2014 | Hadani et al. | |
| 2014/0169406 A1 | 6/2014 | Hadani et al. | |
| 2014/0169433 A1 | 6/2014 | Hadani et al. | |
| 2014/0169436 A1 | 6/2014 | Hadani et al. | |
| 2014/0169437 A1 | 6/2014 | Hadani et al. | |
| 2014/0169441 A1 | 6/2014 | Hadani et al. | |
| 2014/0247803 A1 | 9/2014 | Arambepola et al. | |
| 2014/0348252 A1* | 11/2014 | Siohan .................. | H04L 27/264 375/261 |
| 2014/0364128 A1 | 12/2014 | Lee et al. | |
| 2015/0117395 A1 | 4/2015 | Hadani et al. | |
| 2015/0326273 A1 | 11/2015 | Rakib et al. | |
| 2015/0327085 A1 | 11/2015 | Hadani et al. | |
| 2015/0382231 A1 | 12/2015 | Jabbar et al. | |
| 2016/0043835 A1 | 2/2016 | Hadani et al. | |
| 2016/0135132 A1 | 5/2016 | Donepudi et al. | |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0254889 A1 | 9/2016 | Shattil | |
| 2016/0277225 A1 | 9/2016 | Frenne et al. | |
| 2016/0309345 A1 | 10/2016 | Tehrani et al. | |
| 2016/0380743 A1 | 12/2016 | Rakib | |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0019297 A1 | 1/2017 | Rakib | |
| 2017/0033899 A1 | 2/2017 | Rakib et al. | |
| 2017/0040711 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1 | 4/2017 | Hadani et al. | |
| 2017/0149594 A1 | 5/2017 | Rakib | |
| 2017/0149595 A1 | 5/2017 | Rakib et al. | |
| 2017/0201354 A1 | 7/2017 | Hadani et al. | |
| 2017/0207817 A1 | 7/2017 | Hadani et al. | |
| 2017/0222700 A1 | 8/2017 | Hadani et al. | |
| 2017/0230215 A1 | 8/2017 | Rakib et al. | |
| 2017/0244524 A1 | 8/2017 | Hadani et al. | |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |
| WO | 2017044501 A1 | 3/2017 |
| WO | 2017087706 A1 | 5/2017 |

OTHER PUBLICATIONS

International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
International Search Report for International Application No. PCT/US17/46817, dated Nov. 3, 2017, 3 pages.
Extended European Search Report for Application No. 17840416.6, dated Jan. 30, 2020, 8 pages.
Monk et al., "OTFS—Orthogonal time frequency space" arXiv preprint arXiv:1608.02993. Aug. 2016 (Aug. 2016) [online', [retrieved on Oct. 5, 2017]. Retrieved from the Internet <URL: https://pdfs.semanticscholar.org/63af/a528da067c9180907461f3d8fe5e0629cbd6.pdf> , entire document.
Office Action for U.S. Appl. No. 13/117,119, dated Aug. 5, 2013, 5 pages.
Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.

(56) References Cited

OTHER PUBLICATIONS

Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network_html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

\* cited by examiner

Table 1: Link Level Simulation Parameters

| Parameter | Value |
|---|---|
| Subcarrier spacing | 15 KHz |
| Number of subcarriers | 600 |
| Bandwidth | 10 MHz |
| Multipath model | EVA, ETU |
| Max Doppler | 70, 300 Hz |
| Transmission Time Interval length | 1 msec |
| Transmission scheme | 2x2, 4x4 MIMO-TM3 |
| FEC Coding | Turbo (LTE) |
| Precoding | TM3 for OFDM; identity for OTFS |
| Channel estimation | Ideal |
| Equalization | Genie aided MMSE-SIC and DFE |

FIG. 15

Table 2: Reference Signals Simulation Parameters

| Parameter | Value |
|---|---|
| Subcarrier spacing | 15 KHz |
| Number of subcarriers | 600 |
| Bandwidth | 10 MHz |
| Multipath model | ETU |
| Max Doppler | 300 Hz |
| Pilot grid ($\Delta_\tau \times \Delta_f$) | 1ms x 15KHz |
| Observation window | 600 subcarriers (10 MHz) by 11 time samples (10 ms) |
| Number of antenna ports | 10 |
| Packing (delay x Doppler) | 10x1 |

FIG. 23

LOCALIZED EQUALIZATION FOR CHANNELS WITH INTERCARRIER INTERFERENCE

CROSS REFERENCE TO RELATED APPLICATIONS

This patent document is a 371 National Phase Application of PCT Application No. PCT/US2017/046817, filed on Aug. 14, 2017, which claims the benefit of priority of U.S. Provisional Patent Application No. 62/374,543, filed on Aug. 12, 2016. The entire contents of the before-mentioned patent applications are incorporated by reference as part of the disclosure of this document.

TECHNICAL FIELD

The present document relates to wireless communication, and more particularly, transmission and reception of reference signals in single-input-single-output (SISO) and multiple-input-multiple-output (MIMO) systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for transmitter-side and receiver-side processing of orthogonal time frequency space (OTFS) modulated signals.

In one aspect, a wireless communication method is disclosed. The method may include receiving an orthogonal time frequency space (OTFS) modulated signal. The method may further include receiving the OTFS signal over a wireless communication channel. The method may further include dividing the received OTFS signal along a delay-dimension into a plurality of segments. The method may further include performing, for each segment, channel estimation to produce a plurality of channel estimates corresponding to the plurality of segments, and/or performing, for each segment, channel equalization using a corresponding channel estimate from the plurality of channel estimates to generate a channel-equalized symbol stream. The method may include generating information bits from the channel-equalized symbol stream.

The following features can be included in any combination. Each segment may have an equal duration in the delay domain. The performing the channel equalization may include performing a minimum mean square error based channel equalization. The channel equalization may include performing a turbo equalization using information from the decoded information bits in an iterative manner. The generating information bits may comprise decoding and demapping constellation symbols. The generating the information bits may comprise calculating log-likelihood ratios of the information bits. The OTFS modulated signal may have a Doppler dimension length equal to one and/or may reduce to a single carrier frequency domain multiple access (SC-FDMA) modulated signal.

DESCRIPTION OF THE DRAWINGS

Drawings described herein are used to provide a further understanding and constitute a part of this application. Example embodiments and illustrations thereof are used to explain the technology rather than limiting its scope.

FIG. 15 depicts an example of a table of link level simulation parameters, in accordance with some example embodiments;

FIG. 23 depicts an example of a table of reference signal simulation parameters, in accordance with some example embodiments;

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Figure 1:
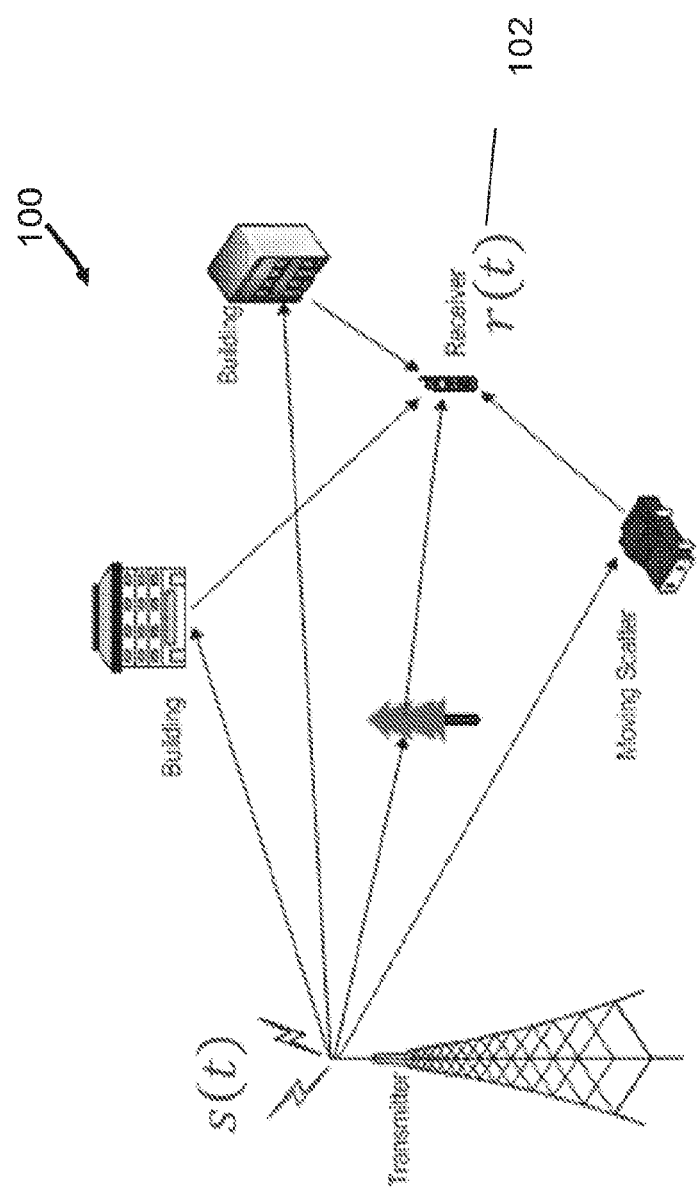
FIG. 1 depicts an example of a communication network, in accordance with some example embodiments.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102.

Figure 2:
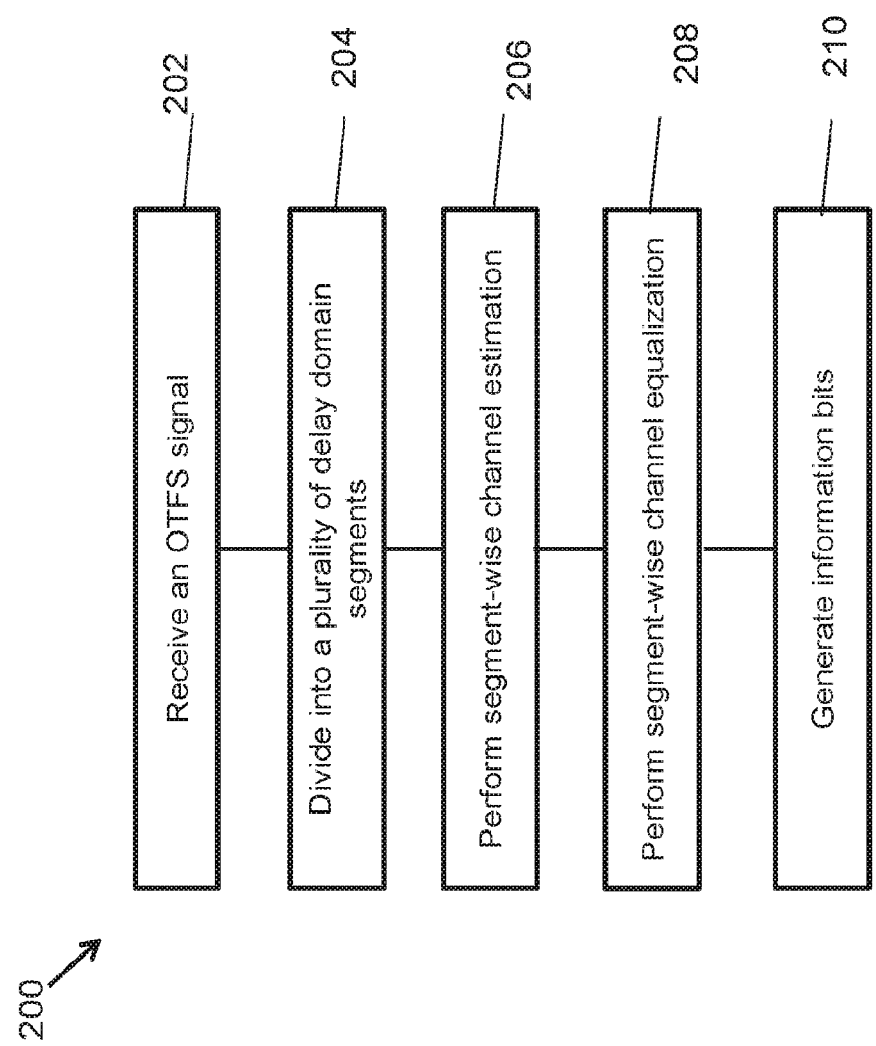
FIG. 2 depicts an example of a process for a wireless transmission method, in accordance with some example embodiments.

FIG. 2 shows an example method 200 of wireless data reception in which the received signal is an OTFS modulated signal.

The method 200 includes, at 202, receiving the OTFS signal over a wireless communication channel.

The method 200 includes, at 204, dividing the received OTFS signal along a delay-dimension into a plurality of segments. In some embodiments, the dividing operation may divide the received signal into M equal-sized segments along the delay dimension. Alternatively, unequal sized segmentation may also be used.

The method 200 includes, at 206, performing, for each segment, channel estimation in a manner that produces a plurality of channel estimates corresponding to the plurality of segments.

The method 200 includes, at 208, performing, for each segment, channel equalization using a corresponding channel estimate from the plurality of channel estimates to generate a channel-equalized symbol stream.

The method 200 includes, at 210, generating information bits from the channel-equalized symbol stream.

This disclosure describes a technique for combating inter-carrier interference for systems that use the Orthogonal Frequency Time Space (OTFS) modulation. Inter-carrier interference (ICI) is a source of degradation in multicarrier systems, that may appear when the wireless channel experiences rapid variations due to high mobility. An architecture is disclosed herein that equalizes the channel and removes the effects of ICI at the same time. OTFS modulation may be implemented as a pre- and post-processing block on top of a multicarrier system.

Figure 3:
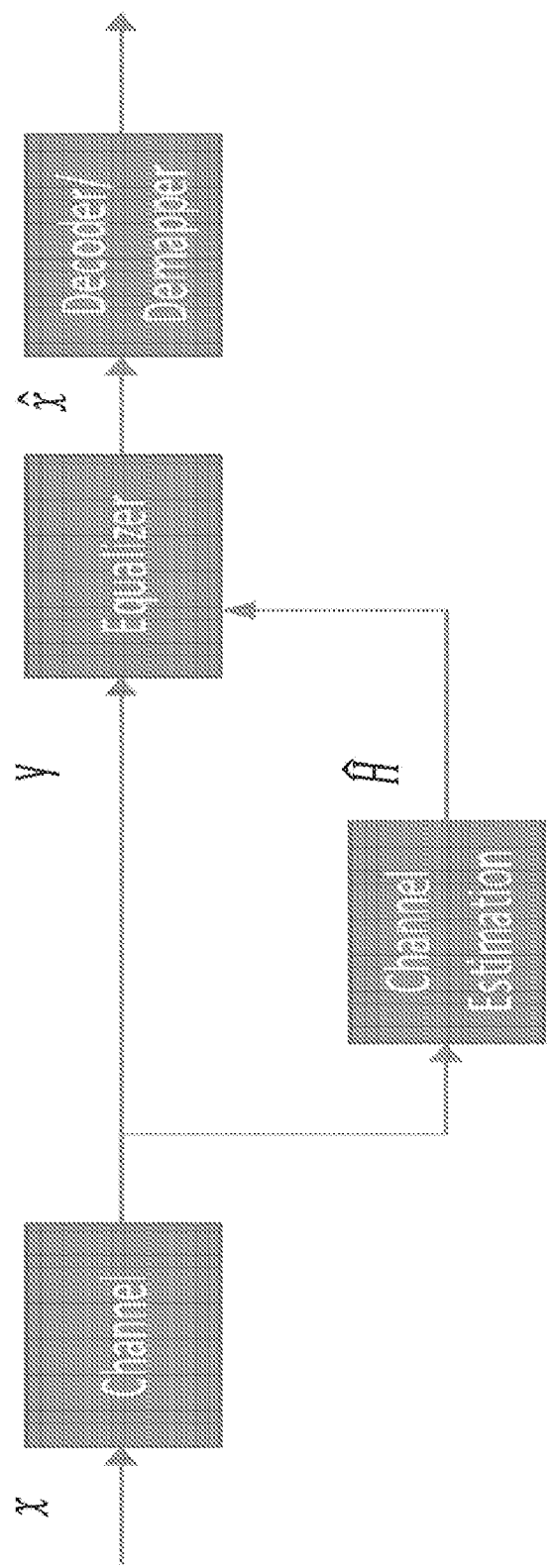
FIG. 3 depicts an example of an architecture for an equalizer/receiver, in accordance with some example embodiments.

FIG. 3 depicts a receiver architecture, in accordance with some example embodiments. A transmitted signal may be distorted by the propagation channel and when the transmitted signal arrives at the receiver, it is processed by a channel equalizer before the digital information is decoded in a decoder/de-mapper. The equalizer may use channel information which may be provided by a channel estimator.

Without loss of generality, in the descriptions below of some of the embodiments, "equalizer" denotes the signal processing functions to provide quadrature amplitude modulation (QAM) symbol estimates (or bit log-likelihood ratios) used by the error correcting decoder. "Equalizer" may refer to signal processing functions for other modulations as well. For example, in an OFDM system the equalizer may include functions not limited to symbol synchronization, cyclic prefix removal, Fast-Fourier Transform (FFT) processing, linear or maximum likelihood equalization, etc. In another example, a single carrier frequency division multiple access (SC-FDMA) system (used in the uplink for Long Term Evolution (LTE)) equalizer may include all the foregoing as well as an inverse discrete Fourier transform (DFT) of the equalized frequency domain signal, and other signal processing functions. In an OTFS system, the equalizer block may also include a transformation of the signal from the time-frequency domain to the delay-Doppler domain where the QAM information symbols are modulated.

When the channel response is not invariant for the duration of an OFDM symbol, the signal may suffer inter-carrier interference. An equalizer that ignores interactions between carriers may suffer performance degradation. This situation may occur when Doppler shifts become more than approximately 2-3% of the subcarrier spacing, either due to high vehicle speeds or high carrier frequency. Remedies may include an increase in the subcarrier spacing (with associated throughput efficiency loss), or the addition of ICI cancellation in the signal processing chain, with an associated increase in complexity.

In an OTFS system, the information bearing QAM symbols may not be modulated over the time-frequency domain but instead over the delay-Doppler domain which is related to the time-frequency domain via a two dimensional Fourier transform. If there is no ICI, then the channel equation is a two dimensional convolution in the delay-Doppler plane (τ, ν) which may be expressed as:

$$y(\tau,\nu)=\iint h(\tau',\nu')x(\tau-\tau',\nu-\nu')d\tau d\nu. \quad \text{(Equation 1)}$$

The effect of ICI on the time-frequency domain may translate into a variation of the channel response in the delay-Doppler domain across the delay dimension, i.e., the convolution kernel h(τ', ν') depends on the delay T, h(τ; τ', ν'). One way to model this variation is to use a Taylor expansion and keep only the first two terms (mean and slope), which may be expressed as:

$$h(\tau;\tau',\nu')=h_0(\tau',\nu')+\tau h_1(\tau',\nu'). \quad \text{(Equation 2)}$$

Another way to model the variation may be to consider the channel to be locally constant in a small portion of the delay dimension. When the total length of the delay dimension is segmented into M segments, and each segment is equalized using the locally invariant channel corresponding to that segment, the robustness of the system to ICI may be improved without ICI cancellation.

Figure 4:
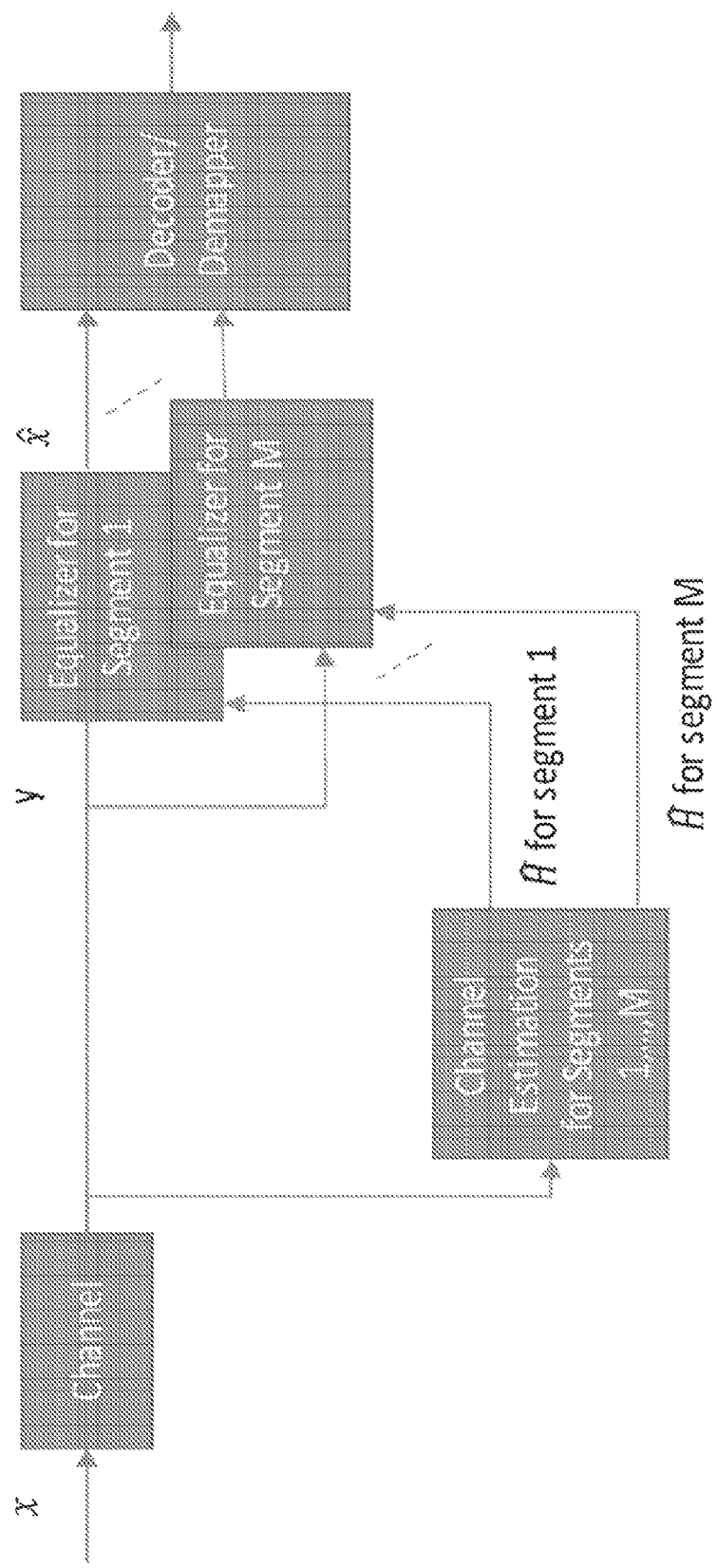
FIG. 4 depicts an example of a receiver architecture with local equalization including M equalizers, one for each of M data segments, in accordance with some example embodiments.

FIG. 4 depicts another example architecture of a system. The received signal may be segmented into M segments along the delay dimension. Instead of a single equalizer as in FIG. 3, the receiver may include a set of M equalizers operating in parallel, one for each segment. The equalizers may be local operations on the delay-Doppler plane, e.g., linear of decision-feedback MMSE (minimum mean squared error) equalizers, or they may be equalizers applied to the totality of the received data either in the delay-Doppler or the time-frequency domains, e.g., linear zero forcing or linear MMSE frequency domain equalizers. At each segment, the equalizer coefficients may be derived using the channel corresponding to the segment.

The channel parameters for each segment may be provided by a channel estimation block based on known pilot or training symbol information embedded in the data.

OTFS modulation may reduce to SC-FDMA modulation when the Doppler dimension of the delay-Doppler domain is reduced to one sample and the two dimensional Fourier transform is reduced to an one dimensional Fourier transform. As such, the above may carry over to SC-FDMA and the above equalization and ICI mitigation technique can be used for SC-FDMA systems as well.

Figure 5:
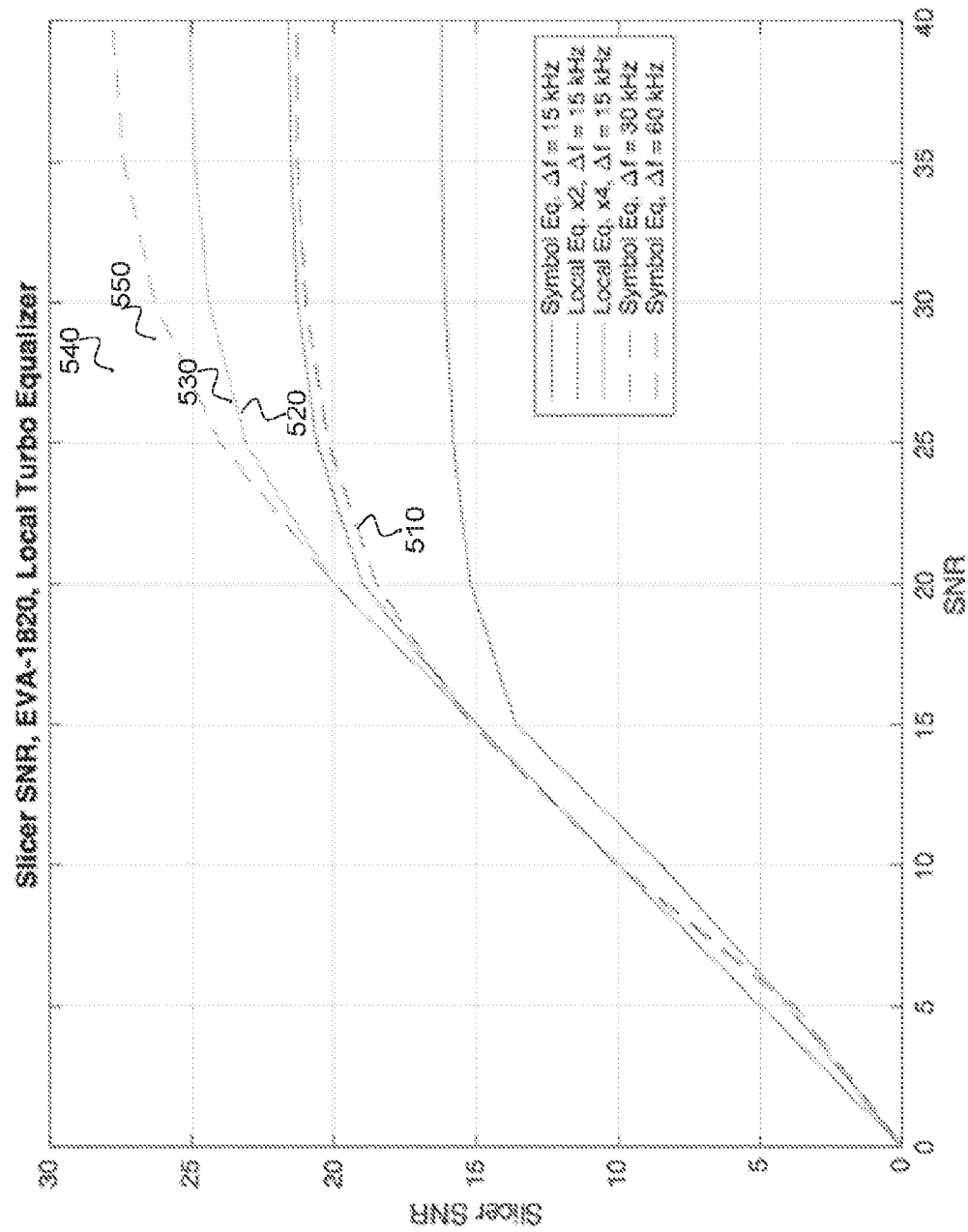
FIG. 5 depicts an example plot of detection signal-to-noise ratio (SNR) versus input SNR for 1, 2, and 4 segments with subcarrier spacing of 15 KHz and 30 KHz, in accordance with some example embodiments.

FIG. 5 depicts an example plot of detection SNR (QAM symbol signal-to-noise ratio (SNR) after the equalizer referred to as "Slicer" SNR in FIG. 5) as a function of input SNR. The line at 510 depicts a baseline performance for a system with subcarrier spacing of 15 KHz. In the baseline example, the detection SNR plateaus at high input SNR due to the effects of ICI. In this example, a standard channel model from the 3GPP standards body is used (enhanced-vehicular-A model) with a Doppler spread of 1820 Hz. This corresponds to a vehicle speed of 500 Km/h for a 4 GHz carrier frequency.

The line at 520 depicts performance with a subcarrier spacing to 30 KHz showing improved performance (over 510) but with approximately a doubling of the cyclic prefix (CP) overhead. Improved performance can also be achieved by segmenting the data into two segments and using two equalizers in parallel as shown at 530 without the additional CP overhead.

Performance improvements can be achieved by quadrupling the subcarrier spacing to 60 KHz (with quadrupling the CP overhead) as shown by the line at 540. Performance improvement can also achieved by segmenting into four segments and using four equalizers as shown by the line at 550.

A 5G modulation should support a number of diverse requirements and use cases (e.g., enhanced mobile broadband eMBB, high-speed use case, massive machine type communication mMTC etc.) including high or low Doppler, delay spread, carrier frequency, etc. This is possible when the modulation scheme utilizes the fading multipath nature of the channel, and extracts the diversity present in the channel in the dimensions of time, frequency and space. Such a flexible waveform can serve as an integral part of a flexible air interface and associated core network.

OTFS is well suited for a time and frequency selective fading channel. OTFS operates in the Doppler induced time varying nature of the wireless channel and parameterizes it as a 2D impulse response in the delay-Doppler domain (described further below). OTFS may also exhibit low reference signal overhead, and enhanced CSI quality and multiple input multiple output (MIMO) performance.

Consistent with some example embodiments, an OTFS air interface design may benefit 5G systems by providing: i) the ability to extract the channel capacity and exploit its diversity with reasonable complexity as the number of antennas grows and ii) the ability to design reference signal schemes that multiplex a large number of antenna ports in a dedicated ("pilot") subgrid of the time-frequency plane. OTFS may achieve performance gains over orthogonal frequency division multiplexing (OFDM) for multiple MIMO configurations.

OTFS modulation may establish a coordinate system to reveal a geometry of a wireless channel. OTFS may augment a channel model by adding a second dimension representing the Doppler characteristics of reflective paths. In this regard, OTFS captures the behavior of the wireless multipath medium in a two-dimensional physical representation that is slowly varying compared to the channel's time and frequency variations. OTFS may convert the time-varying impulse response to a time independent 2D convolution operation for the duration of the transmit time interval TTI, governed by the geometry (for example, location, relative velocity, and angle of arrival) of the physical objects in the propagation path. In this way symbols may experience the full diversity of the channel. The delay-Doppler channel representation in OTFS may allow the acquisition of the coupling between a number of antennas in the network, setting the ground for beamforming, null steering, and scaling with the MIMO order and the number of devices.

In some implementations of OFDM, impulse response $h(\tau, t) \approx h(z)$ may be slowly varying and locally independent of the time variable t. Under this condition and with the addition of a cyclic prefix to the data to ensure the channel effect is a circular convolution, a multiplicative channel model in the frequency domain may be expressed as:

$$Y[m]=H[m]X[m]+V[m], \qquad \text{(Equation 3)}$$

for frequency bins $$m = -\frac{M}{2}, \ldots, \frac{M}{2}-1$$

where H [m] is the frequency response of the channel evaluated at multiples of the subcarrier spacing $\Delta f$. The frequency response may be expressed as:

$$H[m]=\int h(\tau)e^{-j2\pi m \Delta f \tau}d\tau. \qquad \text{(Equation 4)}$$

For a time-frequency fading channel, the simplification of time invariance may be removed and the effects of the time varying channel on the transmitted waveform may be included. Accordingly, the $h(\tau, t)$ time varying impulse response characterization of the channel may be abandoned, and instead the channel may be parameterized by its delay-Doppler response $h(\tau, v)$. In this description, the channel operation on the transmitted waveform s(t) may be described by:

$$r(t)=\iint h(\tau,v)e^{j2\pi v(t-\tau)}s(t-\tau)dvd\tau. \qquad \text{(Equation 5)}$$

Figure 6A:
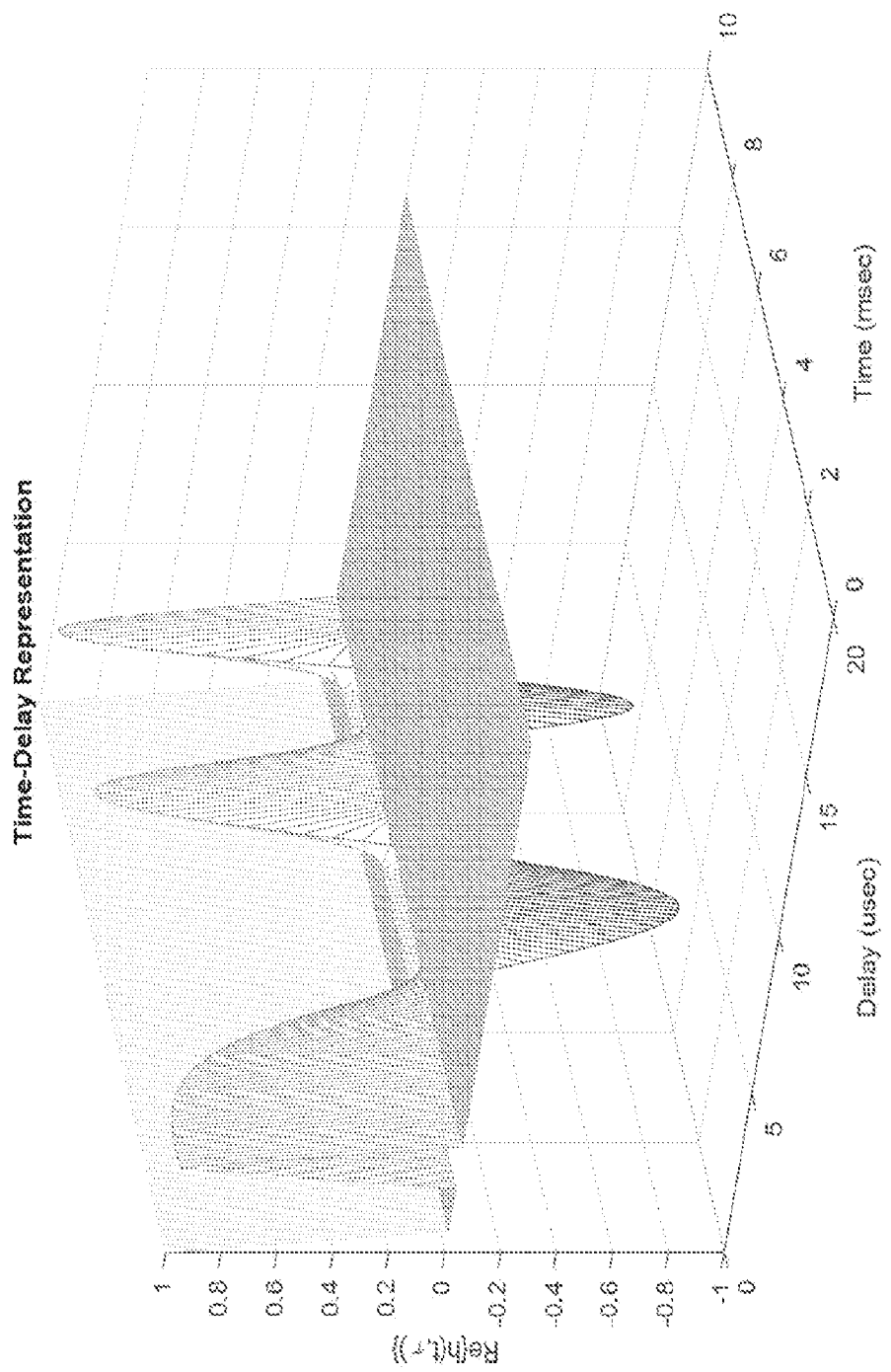
FIG. 6A depicts an example of a trajectory of a time varying impulse response for an accelerating reflector, in accordance with some example embodiments.
Figure 6B:
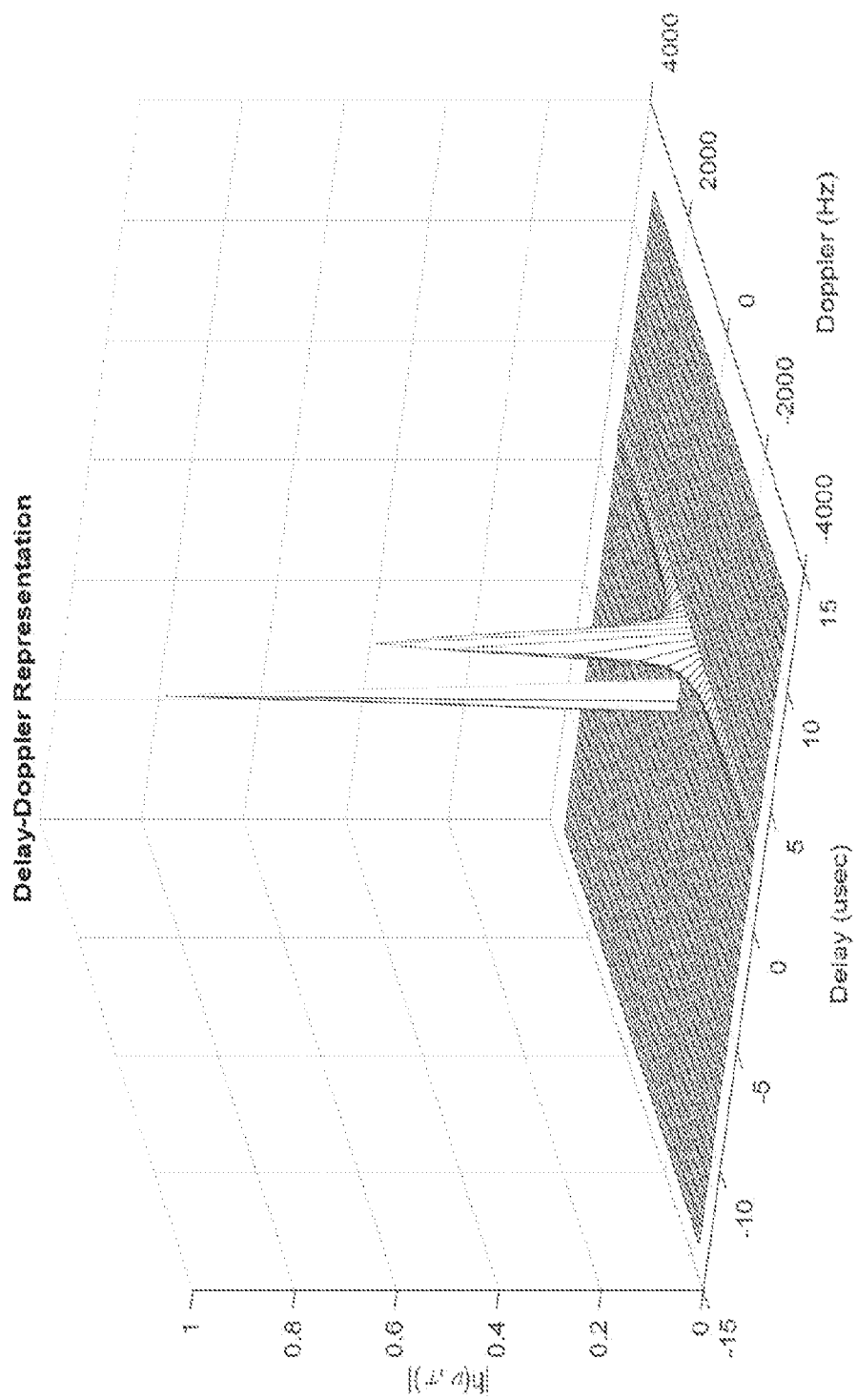
FIG. 6B depicts an example of a delay-Doppler representation for an accelerating reflector channel, in accordance with some example embodiments.
Figure 7:
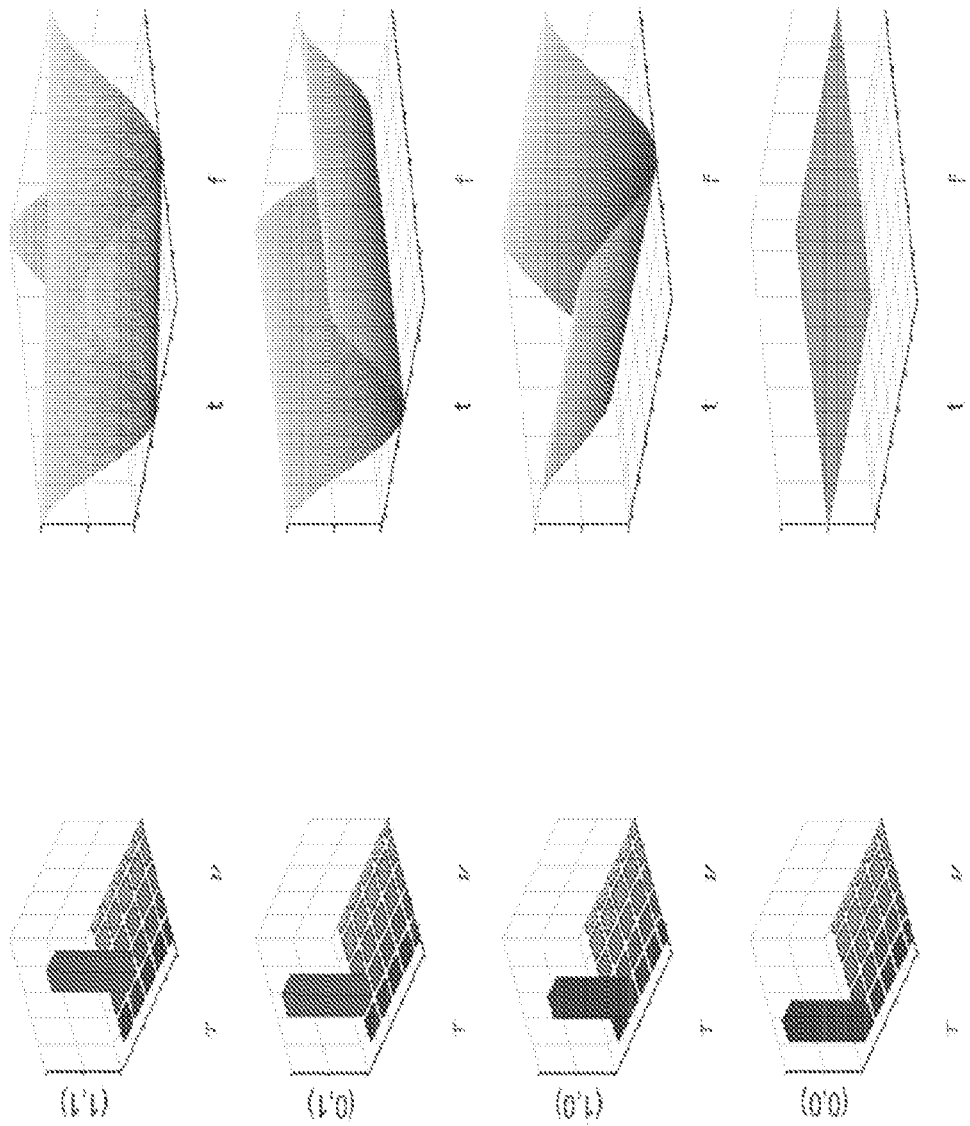
FIG. 7 depicts an example of mapping information symbols (delay-Doppler domain) to basis functions (time-frequency domain), in accordance with some example embodiments.

The delay Doppler impulse response may be interpreted as for every point $(\tau, v)$ the value $h(\tau, v)$ represents the reflectivity of a cluster of reflectors sharing these specific delay and Doppler parameter values. The parameterizations $h(\tau, v)$ and $h(\tau, t)$ may be equivalent and may both describe general time-varying systems (e.g., accelerating reflectors, etc.) when the two parameterizations are related by a Fourier transform along the t axis. An example of the two parameterizations for a channel with two reflectors is shown in FIGS. 6A-6B and 7. The $h(\tau, \nu)$ representation is more compact than the $h(\tau, t)$ representation as demonstrated in FIG. 7. The compactness may be exploited for purposes of channel estimation and equalization.

Using the channel Equation 5, a channel model in the time-frequency domain may be expressed for the given bandwidth and TTI time duration (e.g., of an OFDM system), which may model Doppler effects. Under some conditions, a multiplicative channel model may be obtained that may be expressed as:

$$Y[n,m]=H[n,m]X[n,m]+V[n,m], \quad \text{(Equation 6)}$$

for frequency bins $$m = -\frac{M}{2}+1, \ldots, \frac{M}{2}$$

and time n=0, . . . , N−1 (e.g., measured in OFDM symbols), where N is the total number of symbols (e.g., OFDM symbols) in the TTI. The channel time-frequency response H [n, m] may be related to the delay Doppler impulse response $h(\tau, \nu)$ via the following transform:

$$H[n,m]=\iint h(\tau,\nu)e^{j2\pi\nu nT}e^{-j2\pi n\Delta f\tau}d\nu d\tau, \quad \text{(Equation 7)}$$

where T is the length of the OFDM symbol (plus the cyclic CP extension). Equation 7 may be conceptualized as a 2D Fourier transform version of the delay-Doppler impulse response $h(\tau, \nu)$, or referred to as a Symplectic Fourier transform.

Based on the channel Equations 6 and 7, a pre-processing step may be derived which will transform a multiplicative fading channel to a convolution channel that is time independent for the duration of the TTI. To this end, information bearing QAM symbols x[k, l] may be mapped to the time-frequency symbols X[n, m] via a set of 2D complex exponential basis functions that may be expressed as:

$$X[n,m] = \frac{1}{MN}\sum_{k=0}^{N-1}\sum_{l=0}^{M-1} x[k,l]\, b_{k,l}[n,m] \quad \text{(Equation 8)}$$

$$b_{k,l}[n,m] = e^{-j2\pi\left(\frac{ml}{M} - \frac{nk}{N}\right)}$$

Regarding the basis functions $b_{k,l}[n, m]$ the following is noted: 1) Along the frequency bin dimension m, the basis functions $$e^{-j2\pi\left(\frac{ml}{M}\right)}$$

may constitute a set of DFT (discrete Fourier transform) basis function and relate the frequency domain to a domain which may be referred to herein as the delay domain; 2) Along the time dimension n, the basis functions $$e^{-j2\pi\left(\frac{nk}{N}\right)}$$

may include a set of IDFT (inverse discrete Fourier transform) basis function and relate the time domain to a domain referred to herein as the Doppler domain; 3) OTFS allocates the information QAM symbols x[k, l] in the delay-Doppler domain, the symbols may subsequently transformed to the familiar time-frequency domain via Equation 8. An example of mapping information symbols to time-frequency basis functions is illustrated in FIG. 7.

Notice that the 2D OTFS transform of Equation 8 includes of a DFT along the delay/frequency dimension and an IDFT along the Doppler/time dimension. This may be referred to as a two dimensional Symplectic DFT.

In the receiver, the inverse OTFS transform may be applied, i.e., the inverse Symplectic DFT on the time frequency data according to the following equation:

$$\hat{x}[l,k] = \sum_{m=0}^{M-1}\sum_{n=0}^{N-1} Y(n,m)b^*_{k,l}(n,m) \quad \text{(Equation 9)}$$

$$b^*_{k,l}(n,m) = e^{j2\pi\left(\frac{bn}{M} - \frac{kn}{N}\right)}$$

Figure 8:
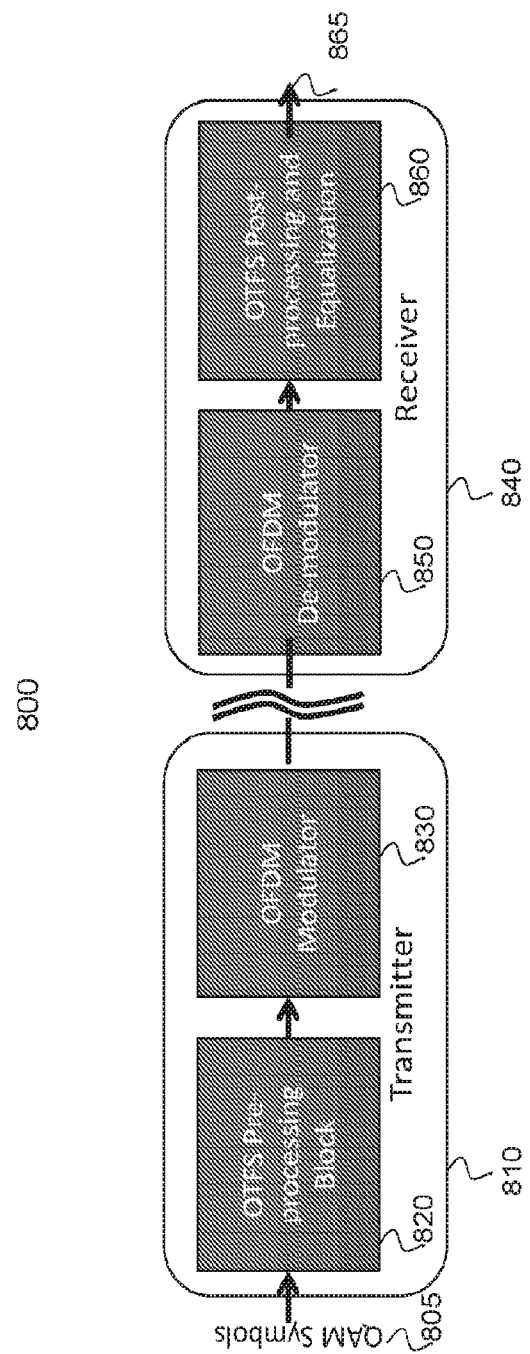
FIG. 8 depicts an example OTFS architecture with OTFS transform pre-processing and post-processing, in accordance with some example embodiments.

In terms of implementation, the OTFS transform includes pre-processing at the transmitter and post-processing at the receiver, as depicted in FIG. 8. For example, OTFS transmitter and receiver architecture 800 includes transmitter 810 and receiver 840. Transmitter 810 includes OTFS pre-processing 820 and OFDM modulator 830. Receiver 840 includes OFDM demodulator 850 and OTFS post-processing and equalization 860. Pre-processing 820 may include the operation of Equation 8 and post-processing 860 may include the operation of Equation 9. OTFS modulation may also be derived as a pre- and post-processing of multicarrier systems other than OFDM (e.g., filterbank multicarrier).

OTFS pre- and post-processing may enable QAM modulation in the delay-Doppler domain, where the QAM symbols see the same 2D convolution channel and the difficulties associated with time and frequency fading within the TTI may be avoided. In particular, the end-to-end channel in the delay-Doppler domain may be expressed as the following 2D circular convolution:

$$\hat{x}[k,l] \simeq \frac{1}{MN}\sum_{m=0}^{M-1}\sum_{n=0}^{N-1} x[n,m]h_w\left(\frac{l-m}{M\Delta f}, \frac{k-n}{NT}\right) + v[k,l] \quad \text{(Equation 10)}$$

The delay-Doppler impulse response $h_w(\tau,\nu)$ may be a continuous 2D circular convolution of the delay-Doppler channel response $h(\tau, \nu)$ with a two-dimensional Dirichlet kernel introduced due to the finite transmission bandwidth and TTI or OTFS frame length.

$$h_w(\tau, \nu) = \iint e^{-j2\pi\nu'\tau'} h(\tau', \nu') w(\tau - \tau', \nu - \nu') d\tau' d\nu' \quad \text{(Equation 11)}$$

$$w(\tau, \nu) = \sum_{m=0}^{M-1}\sum_{n=0}^{N-1} e^{-j2\pi(\nu nT - \tau m\Delta f)} \quad \text{(Equation 12)}$$

Equation 10 indicates that the end-to-end transmission scheme in the delay-Doppler domain can be expressed as a 2D-convolutive scheme over the whole TTI in both the delay and Doppler dimensions.

Figure 9:
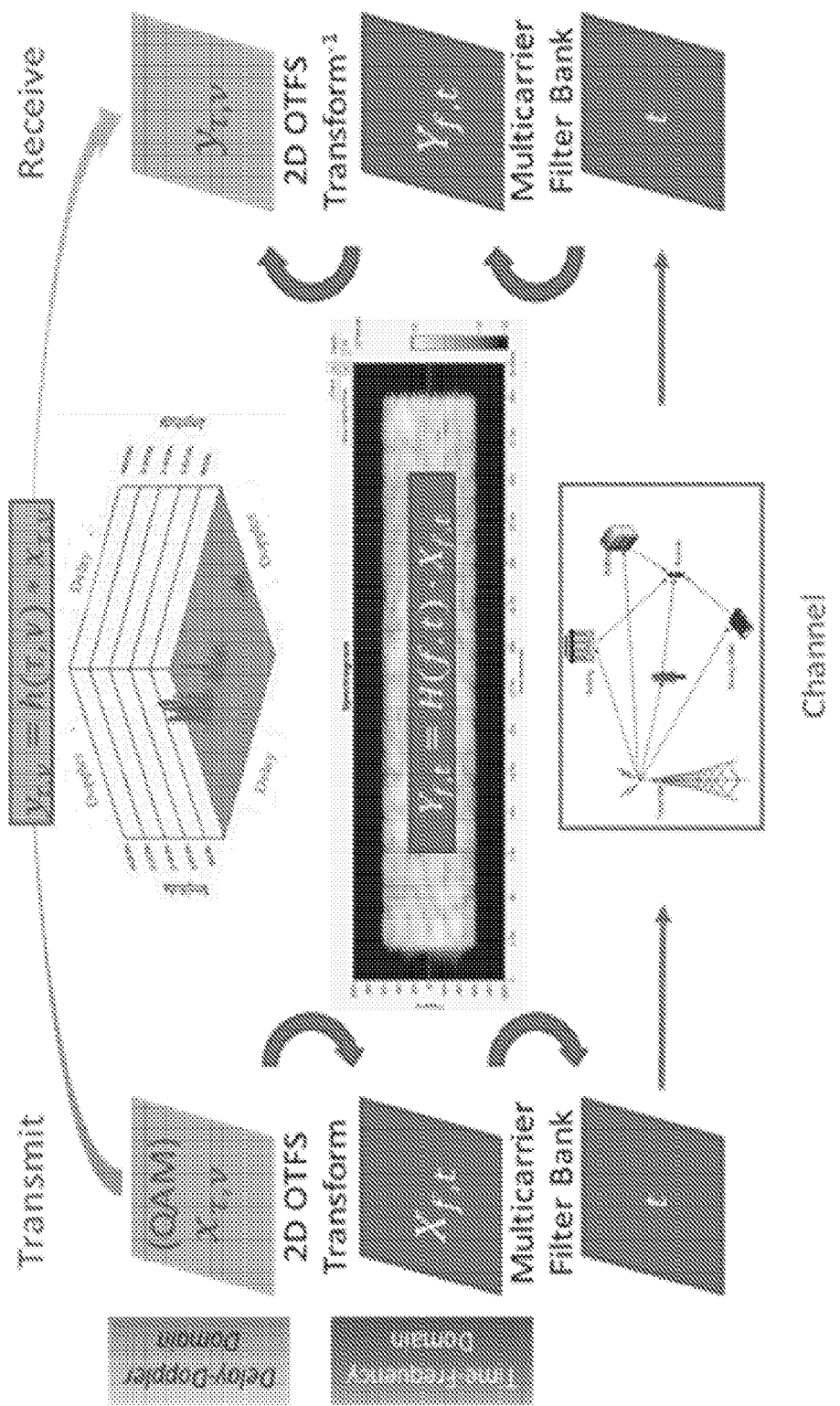
FIG. 9 depicts three example views of a channel in the waveform, time-frequency, and delay-Doppler domains, in accordance with some example embodiments.

FIG. 9 illustrates an example of processing flow of the OTFS transform and the underlying multicarrier system as well as the nature of the channel in the delay-Doppler domain in contrast to the time-frequency and waveform domains. FIG. 9 depicts the multiplicative versus 2D-convolutive nature of the channel in the time-frequency verses delay-Doppler domains respectively.

This OTFS architecture has many benefits including: 1) resolution of the reflectors in both the delay and Doppler domains, thus extracting the time and frequency diversity of the channel; 2) transformation of the fading channel in the time-frequency domain to a time invariant channel in the delay-Doppler domain for the duration of the TTI. The time invariance property holds even if the TTI length is larger than the coherence time of the channel.

Receiver equalizer architectures are suggested by the form of Equation 10. Since the channel manifests itself as a 2D circular convolution, a receiver architecture that extends to two dimensions may be used. In some example embodiments, a receiver may be a linear minimum mean squared error (MMSE) or zero forcing (ZF) receiver, which can be implemented in either the time-frequency or delay-Doppler domains. Higher performance can be obtained with more advanced receivers including decision feedback equalizers (DFE) and turbo equalizers.

In MIMO systems, Equation 10 generalizes to a matrix 2D circular convolution, enabling the adaptation of a number of different MIMO architectures like linear MMSE, multichannel DFE, SIC, and approximate maximum likelihood (ML). In terms of complexity, in the SISO case the linear MMSE receiver may be least complex and may be similar to the complexity of an OFDM MMSE receiver. A DFE receiver consists of a feedforward part, with complexity equivalent to the linear MMSE receiver, and an additional feedback part tightly coupled with a detector. This translates to some additional complexity compared to a linear OFDM receiver.

In the MIMO case, a comparison of complexity is less straightforward. A multichannel DFE is more complex than a linear MMSE, but when compared with nonlinear OFDM receivers like successive interference cancellation SIC and maximum likelihood ML, the DFE receiver may get close to capacity with less complexity than an ML OFDM receiver (especially for high order MIMO).

Reference signals (RSs) may be placed in the time-frequency domain to assist the receiver in estimating the channel, often in coarse (regular or irregular) grid throughout or beyond the TTI. In OFDM systems, multiple antenna ports may be multiplexed on the same coarse grid using different (orthogonal) signature sequences on the coarse RS grid points (e.g., using Hadamard codes or Zadoff-Chu sequences). Understanding the effects of the channel in the delay-Doppler domain can lead to better multiplexing of antenna port RSs either in the time-frequency or the delay-Doppler domains. For example, significant improvements in the RS overhead can be achieved when multiplexing a large number of antenna ports.

Figure 10:
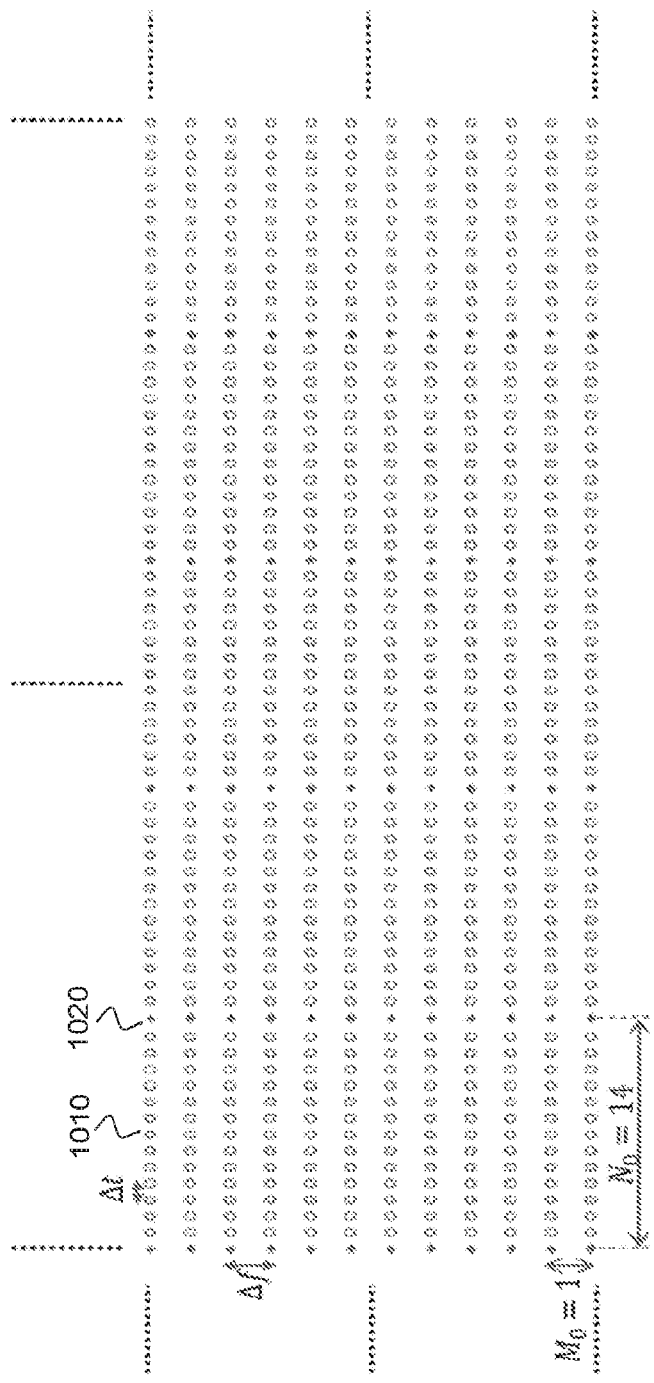
FIG. 10 depicts an example of a time-frequency reference signal (RS) grid, in accordance with some example embodiments.

The RSs may be placed in a coarse grid of every N_0 symbols and every M_0 subcarriers. For example, in the uplink the SRSs can be placed on a grid with N_0=14 and M_0=1 for a spacing of 1 millisecond (msec) between successive SRS symbols, as shown at 1020 in FIG. 10, resulting in a reference signal overhead of approximately 7% (FIG. 10 depicts many dots 1020 with one labeled). The data portion of the time-frequency grid is shown by the circles 1010. (FIG. 10 depicts many grid circles 1010 with one labeled).

The multiplicative channel equation may still hold in the coarse RS grid, $$Y_p[nN_0, mM_0] = H[nN_0, mM_0]X_p[nN_0, mM_0] + V[nN_0, mM_0].$$ (Equation 13)

Taking a RS frame in the coarse grid of $M_p$ RS subcarriers times $N_p$ RS symbols a RS time-frequency can be defined and an associated delay-Doppler frame. For example, in the case of SRSs, $M_p=600$ subcarriers (for a 10 MHz system) times say $N_p=5$ SRS symbols spaced 1 msec apart for a 5 msec RS observation window.

To multiplex multiple antenna ports in this coarse RS grid, the multiplexing RS sequences are preferably orthogonal. This design may be considered in the time-frequency domain but it equivalently may be performed in the delay-Doppler domain where the characteristics of the channel are more readily apparent. As an illustration, Hadamard codes in the time-frequency domain may be used in UE specific RSs due to their orthogonality. However, this orthogonality may be lost due the channel effects. Disclosed herein are orthogonal RS sequences that approximately maintain their separation or orthogonality after the channel effects.

The channel equation of Equation 13 applies for the RS subgrid, and therefore the equivalent channel equation in the delay-Doppler domain which may be given by:

$$\hat{x}_p[k, l] \simeq \frac{1}{M_p N_p} \sum_{m=0}^{M-1} \sum_{n=0}^{N-1} x_p[n, m] h_w\left(\frac{l-m}{M_p M_0 \Delta f}, \frac{k-n}{N_p N_0 T}\right)$$ (Equation 14)

Figure 11:
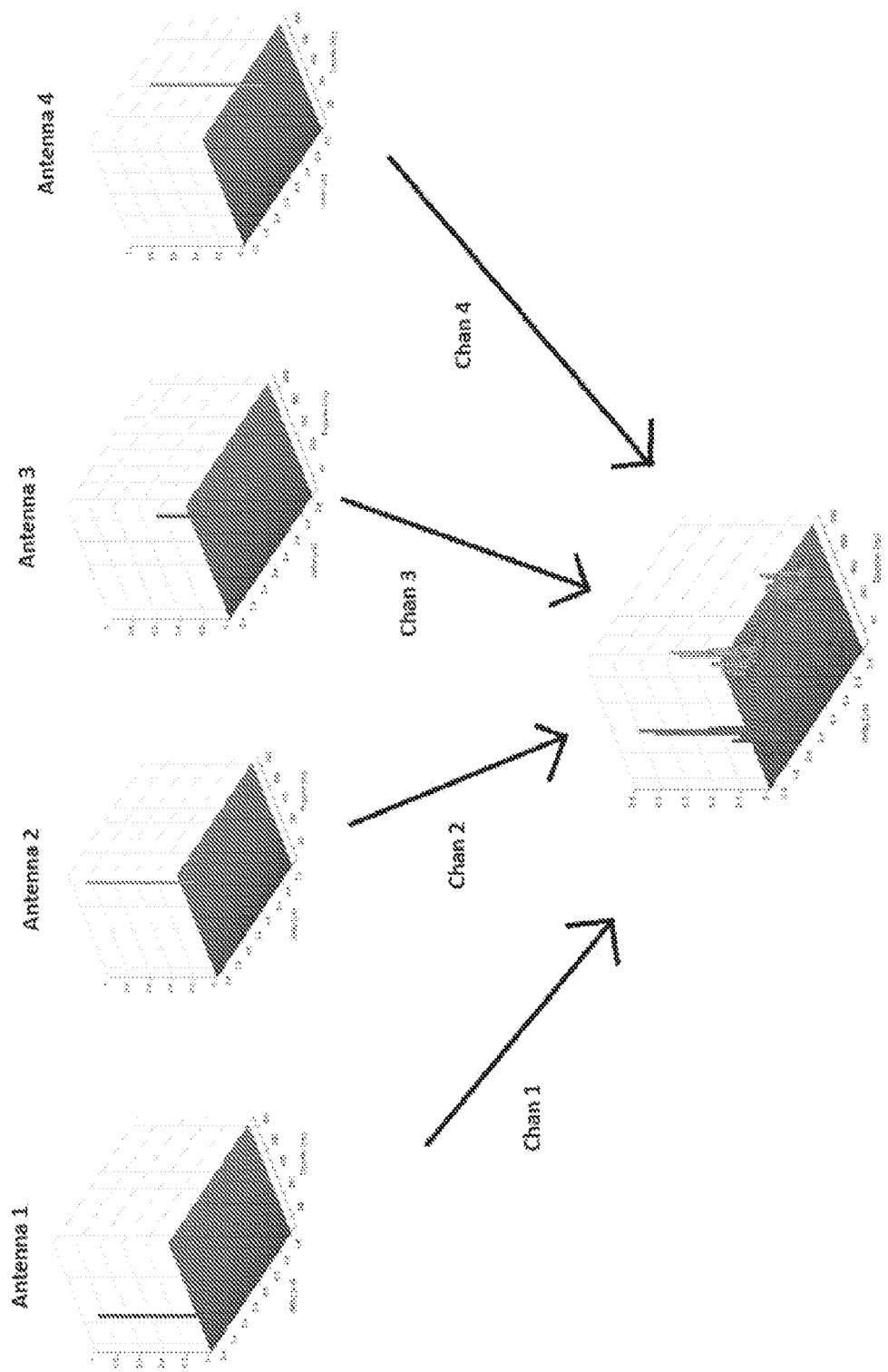
FIG. 11 depicts an example of antenna ports multiplexed in the delay-Doppler domain, in accordance with some example embodiments.

The foregoing convolution Equation 14 indicates that the effects of the channel are local, that is a delta in the delay-Doppler domain will be spread to the extent of the support of the channel in the delay and in the Doppler dimensions. This motivates multiplexing antenna ports in this domain, i.e., represent each antenna port sequence as an RS impulse, and space the impulses apart sufficiently, so that when the impulses are spread by the channel they do not overlap or overlap minimally. FIG. 11 shows an example of an arrangement of RS antenna ports in the delay-Doppler domain. Each antenna port RS in FIG. 11 is generally affected by a different channel. Equivalently, each one of the deltas in the delay-Doppler domain corresponds to a two dimensional complex exponential on the coarse grid of the time-frequency domain. In this way, these RS sequences are two dimensional extensions of the Zadoff-Chu sequences.

Figure 12:
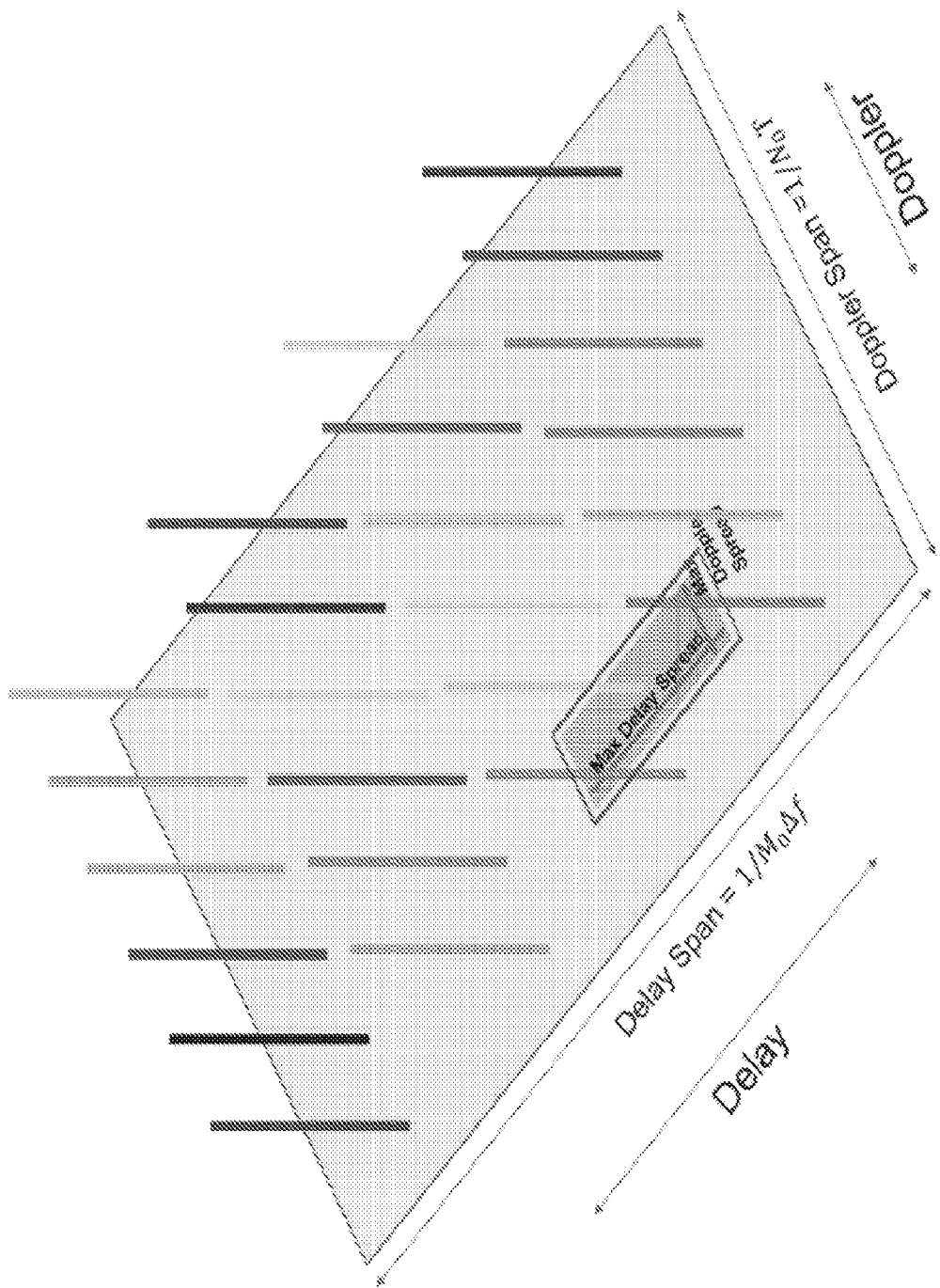
FIG. 12 depicts an example of packing 24 RSs in the continuous delay-Doppler plane, in accordance with some example embodiments.
Figure 13:
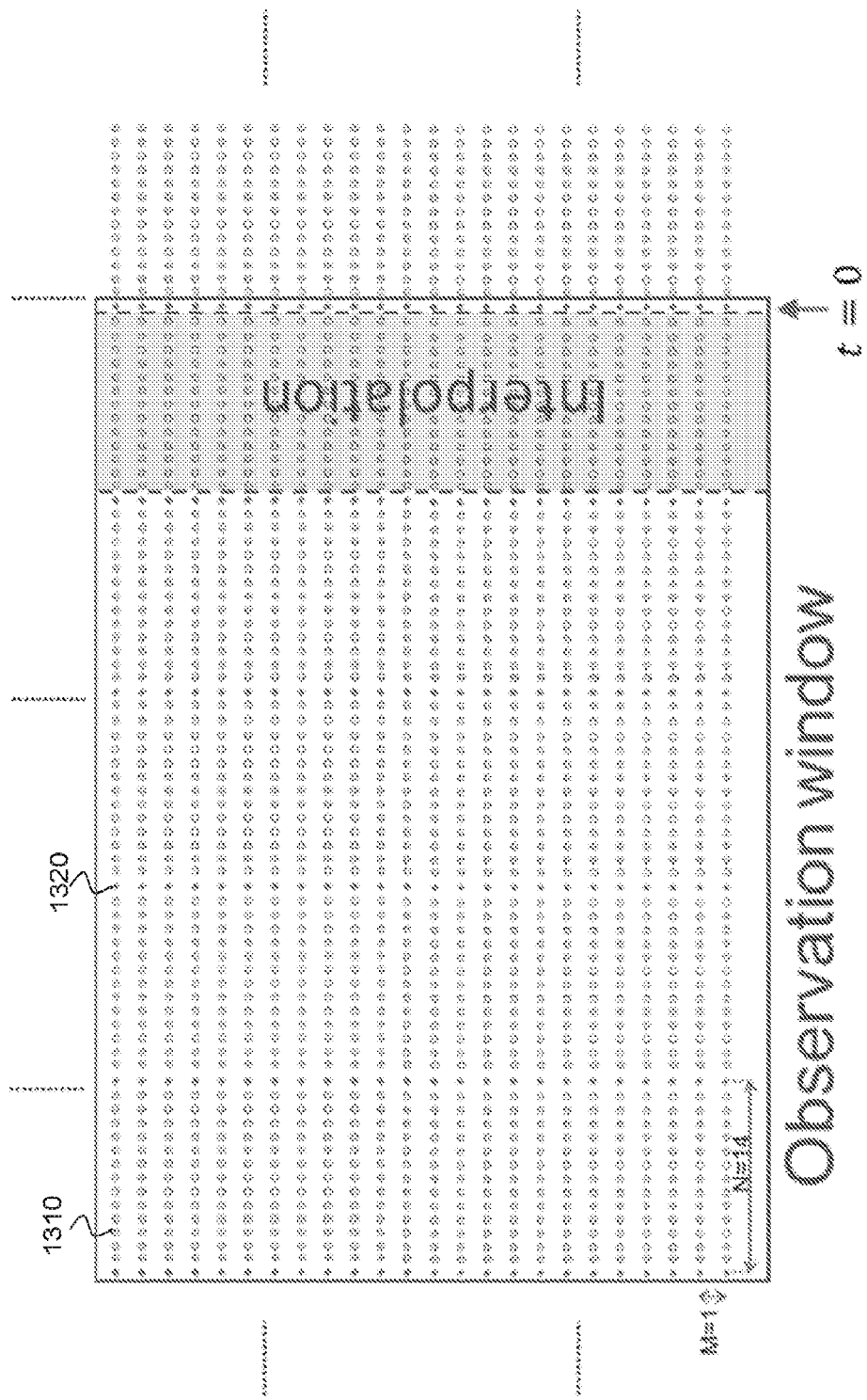
FIG. 13 depicts an example of a time-frequency observation window, in accordance with some example embodiments.

The number of antenna ports that can be supported simultaneously in the delay-Doppler plane is affected by the following parameters: 1) Delay and Doppler spreads of the channels. FIG. 12 depicts, an example of packing 24 RSs in the continuous delay-Doppler plane. The shaded area shows the maximum delay and Doppler spreads of a channel, and the solid line around the shaded area shows the additional area assigned to handle the observation window; 2) The size of the delay-Doppler plane. If the resolution of the RS grid in the time-frequency domain is $N_0 T \times M_0 \Delta f$, then the size (span) of the associated delay-Doppler plane is $1/M_0\Delta f \times 1/N_0 T$. As an example, if the RS grid is $N_0 T \times M_0 \Delta f = 1$ ms×15 kHz then the size of the associated delay-Doppler plane is 66.67 µs×1 kHz; and 3) The size of the receiver observation window in both time and frequency dimensions. FIG. 13 depicts a time-frequency observation window example where points 1320 represent the RS grid and points 1310 represent the data grid. The observation window in the time-frequency plane may induce a convolution with a Dirichlet kernel, increasing the energy of the received RS beyond its delay and Doppler spreads. As a result, a larger observation window will improve the RS packing.

For estimation of the channel response, the reference signal of each antenna port may occupy an area in the delay-Doppler plane with dimensions of at least the delay and Doppler spreads of its channel. If all the channels have the same (or nearly the same) delay and Doppler spreads $\Delta_\tau$ and $\Delta_v$ respectfully, and the delay and Doppler spans of the delay-Doppler plane are $C_\tau^P$ and $C_v^P$ respectfully, then the maximum number of RSs that can be supported is given by $N_{max\_\tau}^P$, $N_{max\_v}^P$ where $N_{max\_\tau}^P$ and $N_{max\_v}^P$ are given by:

$$N_{max\_\tau}^P = \lfloor C_\tau^P / \Delta_\tau \rfloor$$

$$N_{max\_v}^P = \lfloor C_v^P / \Delta_v \rfloor \quad \text{(Equation 15)}$$

For example, for ETU-50 channels (5 microsecond delay and 50 Hz maximum Doppler) and RS grid with resolution 1 ms×15 kHz, the maximum number of RSs that can be supported is $\lfloor 66.67/5 \rfloor \cdot \lfloor 1000/100 \rfloor = 13 \cdot 10 = 130$. This number assumes an infinite observation window. With a finite observation window (limited channel bandwidth and length of time collecting RSs samples) the actual number will be lower but still significant—for example, 11·8=88. Note that these 88 multiplexed RSs occupy only 7% of the available throughput, thus the overhead per RS or antenna port is 7%/88=0.08%—lower than currently supported in LTE. As another example, to support ETU-300, it can be shown that in a 10 MHz channel at least 10 RSs can be supported in the delay dimension with low enough channel estimation MSE to support high constellations. This corresponds to an overhead per RS of 0.7%.

Separating the RSs from the data allows for increasing the RS observation window in time, enabling the packing of a larger number of RSs in the Doppler dimension. Note that the large observation window may not introduce latency in the processing of the data. As shown in FIG. 13, the receiver may collect a history of RS samples and when the data arrives it uses the RS history plus the next RS sample following the data to estimate the channel and receive the data.

Figure 14:
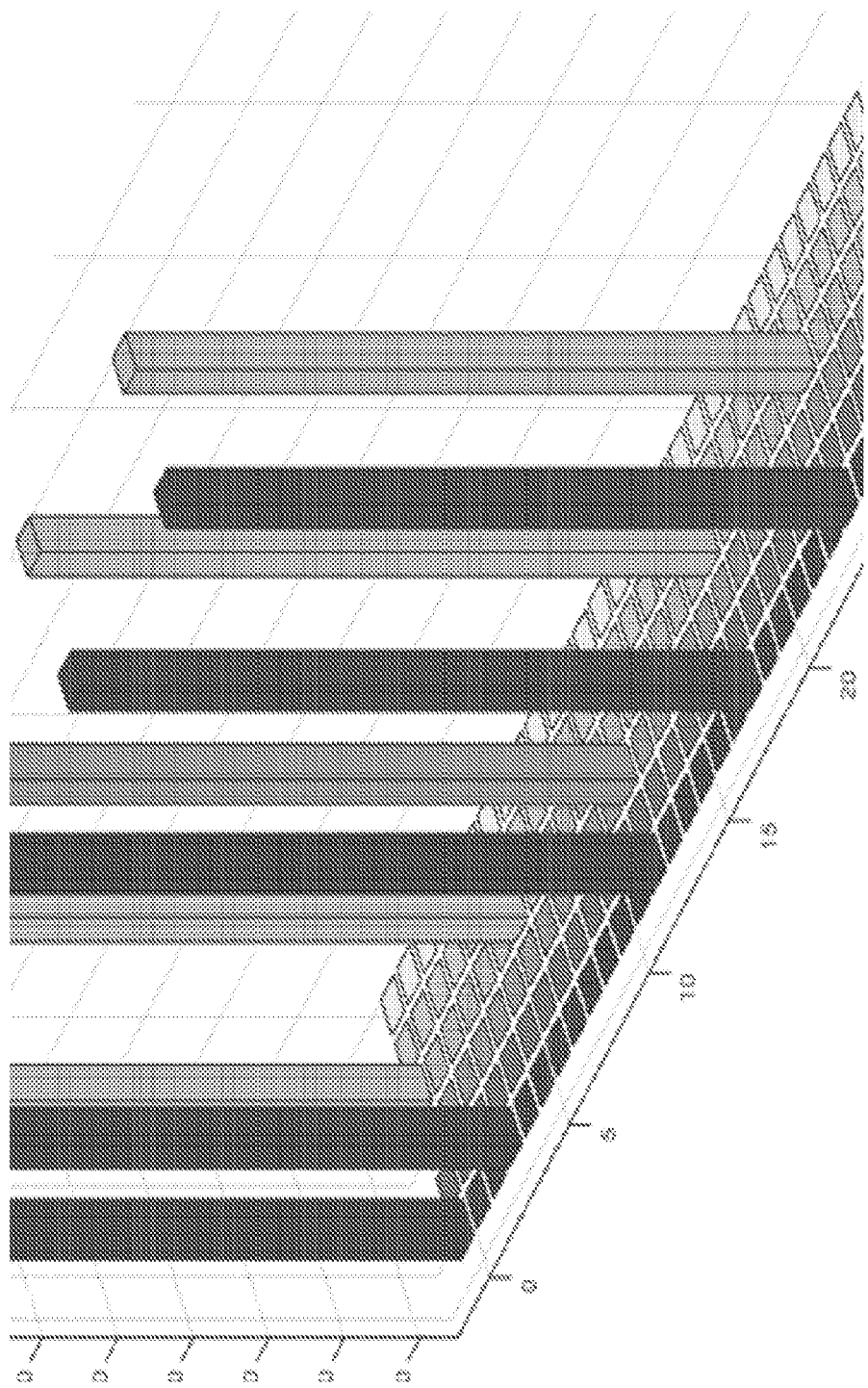
FIG. 14 depicts positioning of RSs with different delay and Doppler spreads in the delay-Doppler plane, in accordance with some example embodiments.

Packing the RSs in the delay-Doppler plane has multiple advantages, including: 1) Ability to support channels with different delay and Doppler spreads by separating the RSs in the delay-Doppler plane with minimum distances required to support the delay and Doppler spreads of each channel. FIG. 14 shows an example of different distances between RSs in the delay-Doppler plane; and 2) More flexibility in packing the RSs, as the RSs can be placed anywhere in the continuous delay-Doppler plane as opposed to the finite grid selection available in the time-frequency plane.

The performance of an OTFS system may be compared to an OFDM system with the same PHY parameters (BW, subcarrier spacing etc.) and the same FEC coding. For example, the OTFS performance may be evaluated in the ETU-300 Doppler channel and the EVA-70 channel. In the figures, results for 1×1, 2×2, 4×4 and 8×8 MIMO with CSIR (channel state information reference) are shown.

Details of simulation parameters are summarized in Table 1 shown in FIG. 15. The performance for both systems may be compared in ideal conditions to provide an indication of the potential performance and performance differences. Ideal channel estimation and genie aided equalization may be used for both OFDM and OTFS simulations. MMSE equalization with genie aided successive interference cancellation may be used for OFDM based on the ideal channel, while MMSE-DFE may be used for OTFS in the delay-Doppler domain with no error propagation based on the ideal channel. A rate ⅓ Turbo code may be used in LTE for both systems but the packet size constraints/quantization may be relaxed to get identical code rates for both systems. One codeword per layer may be mapped for both systems. An identity precoder may be used for the OTFS simulation and a TM3 precoder may be used for the OFDM 1×1, 2×2, and 4×4 simulations and an identity precoder for the 8×8 simulation.

Figure 16:
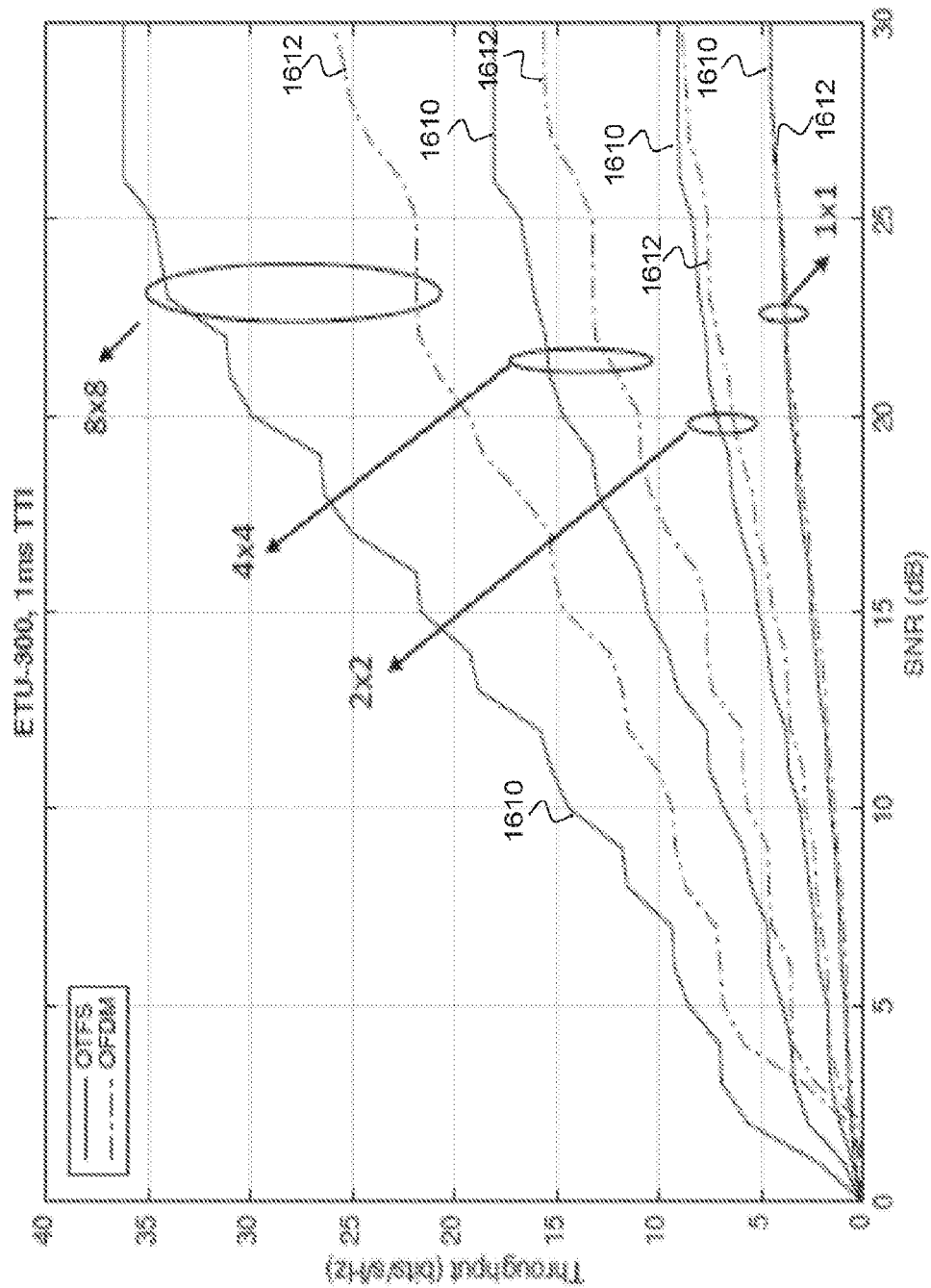
FIG. 16 depicts an example of a comparison of OTFS to OFDM for ETU-300 with 1×1, 2×2, 4×4 and 8×8 MIMO, in accordance with some example embodiments.

An example chart comparing performance as throughput versus SNR is depicted in FIG. 16. For each SNR point, the throughput for all modulation and coding schemes MCSs is estimated by simulation and the maximum one is plotted. FIG. 16 simulates the performance of an open loop MIMO system with slow adaptation where average CQI is fed back to the transmitter. Plots 1610 corresponding to OTFS performance is better in each case than the OFDM performance 1612. The OTFS performance increase over OFDM grows as the MIMO order grows from 1×1 to 2×2 to 4×4 to 8×8.

Figure 17:
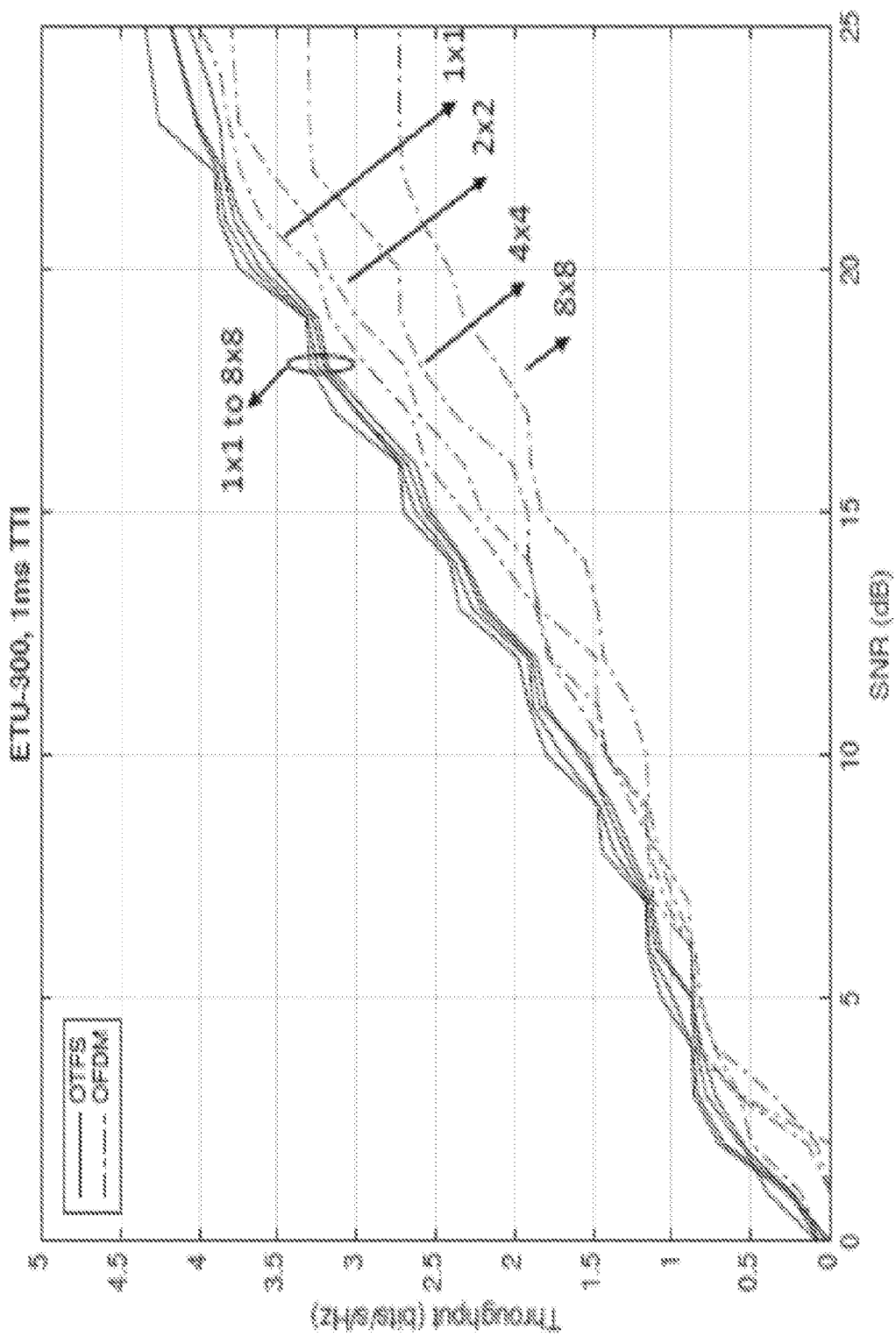
FIG. 17 depicts an example of a comparison of throughput per stream for OTFS and OFDM using ETU-300 for 1×1, 2×2, 4×4 and 8×8 MIMO, in accordance with some example embodiments.
Figure 18:
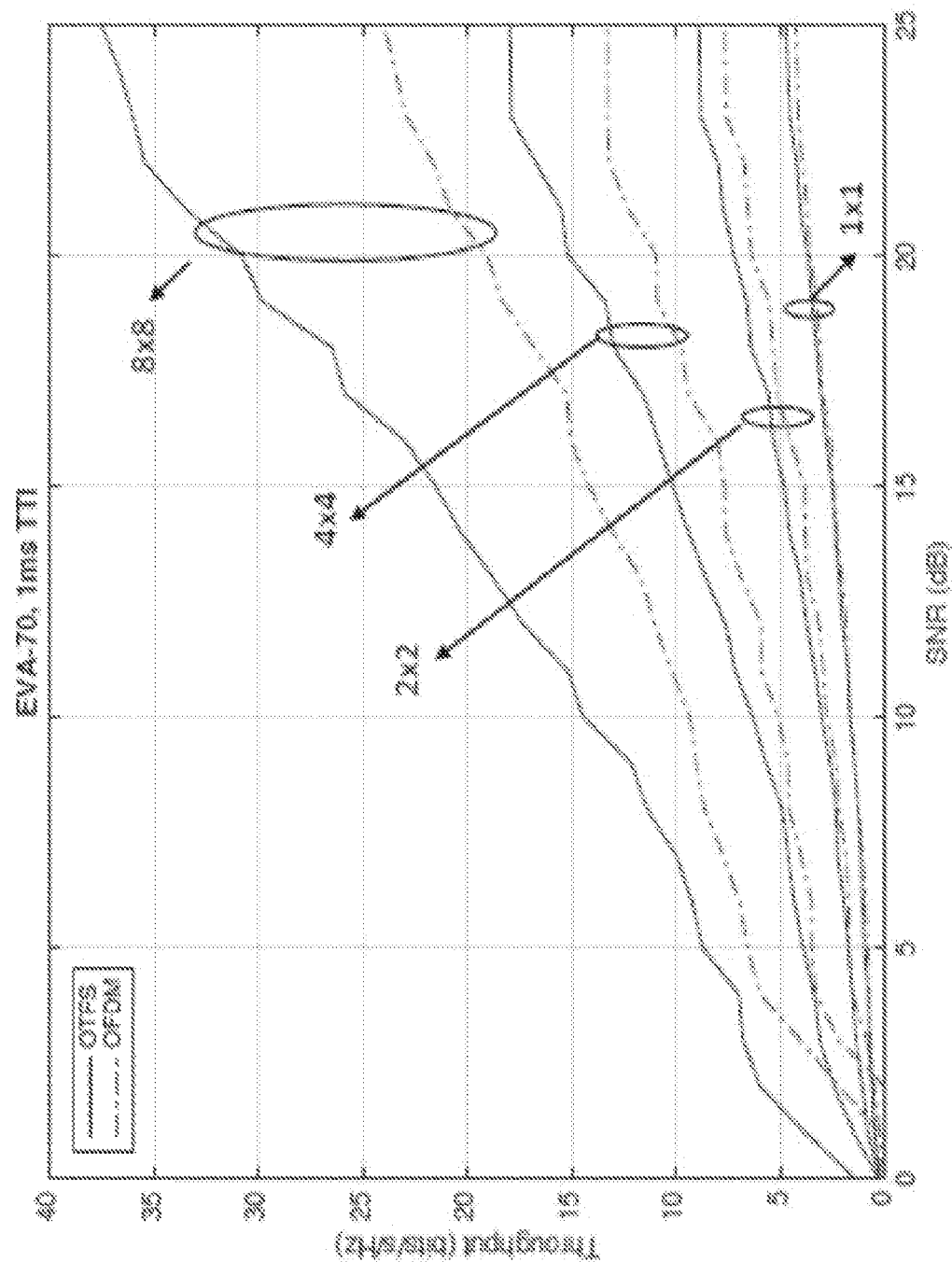
FIG. 18 depicts an another example of a comparison of throughput for OTFS and OFDM using extended vehicle A EVA-70 with for 1×1, 2×2, 4×4 and 8×8 MIMO, in accordance with some example embodiments.
Figure 19:
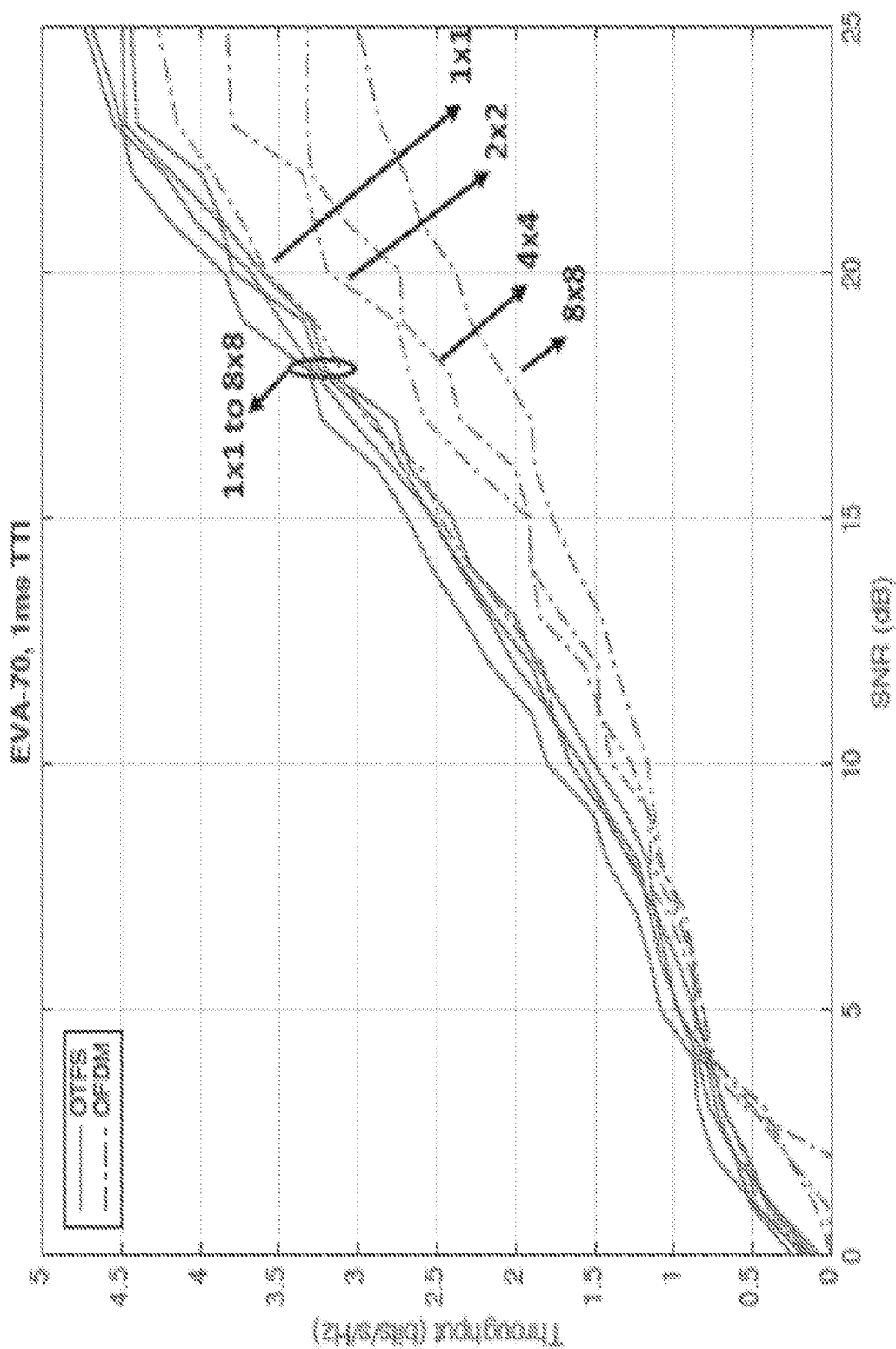
FIG. 19 depicts an another example of a comparison of throughput for OTFS and OFDM using EVA-70 with for 1×1, 2×2, 4×4 and 8×8 MIMO, in accordance with some example embodiments.

FIG. 17 depicts the performance for the same conditions as FIG. 16 plotted as throughput per stream versus SNR. FIG. 18 and FIG. 19 show the performance for the EVA-70 channel as total throughput and throughput per stream, respectively. Notice that similar or greater performance gains are seen in this channel as well.

Figure 20:
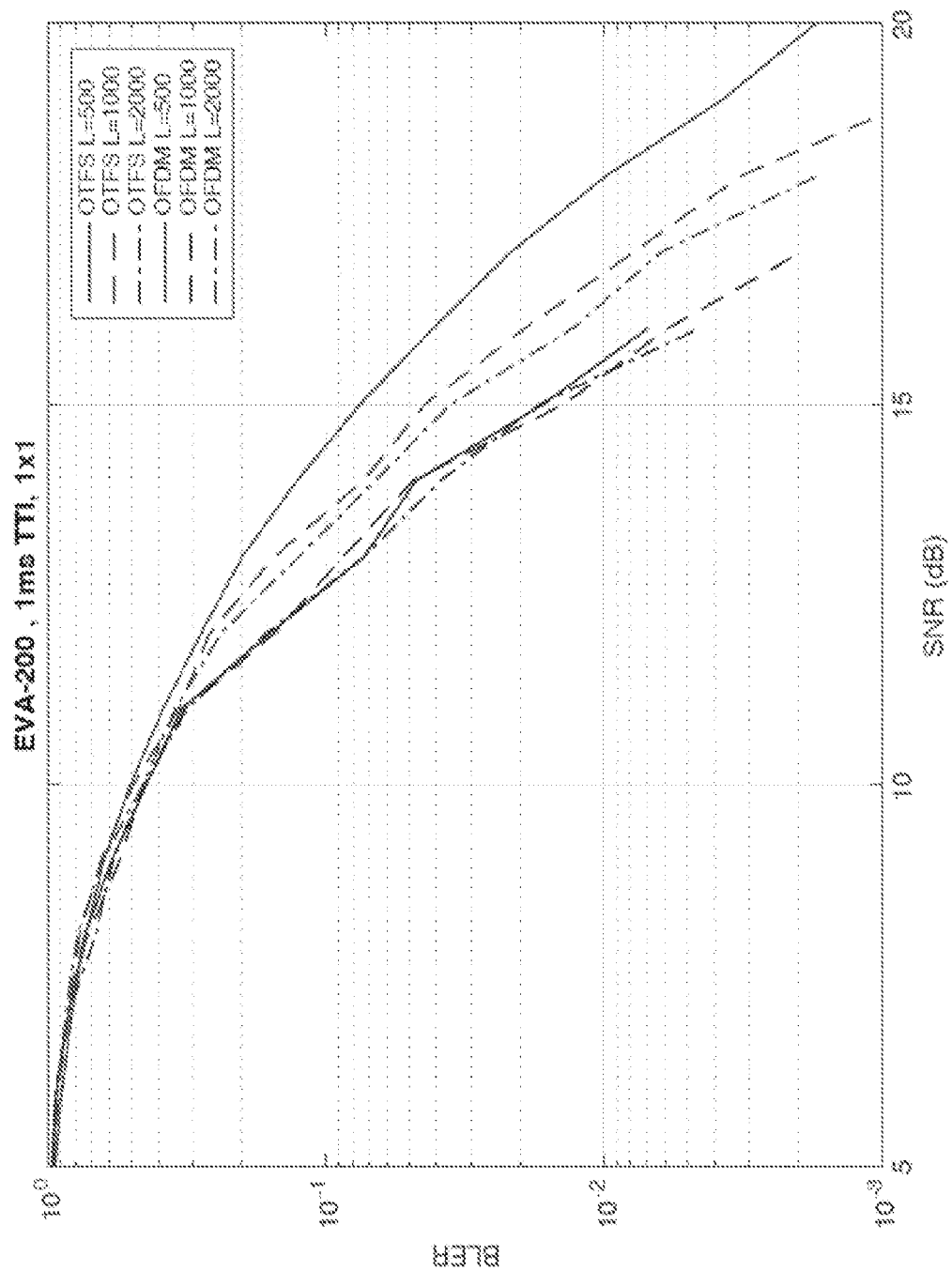
FIG. 20 depicts an example of a block error rate (BLER) SISO for codeblock sizes of 500, 1000, and 2000 bits using EVA-200, in accordance with some example embodiments.
Figure 21:
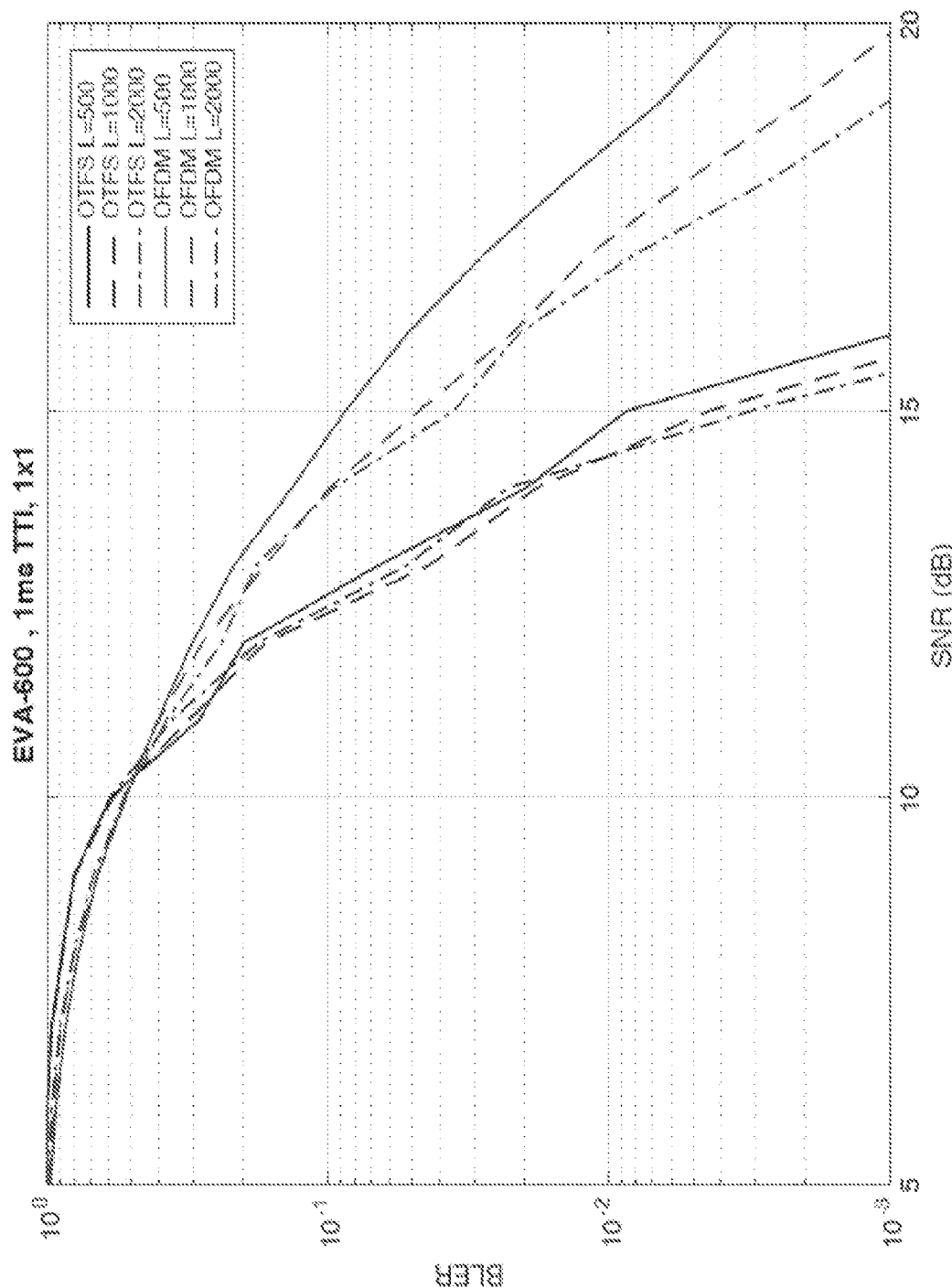
FIG. 21 depicts an example of BLER SISO for codeblock sizes of 500, 1000, and 2000 bits using EVA-600, in accordance with some example embodiments.

Examples of the performance of OTFS as a function of codeblock size is depicted in FIGS. 20-21. FIG. 20 shows BLER SISO performance for the EVA-200 channel, when the codeblock size is 500, 1000 and 2000 bits. LTE CQI index 9 was used in this simulation (16 QAM, rate 0.6). Notice that the OTFS performance does not depend on the codeblock size, but the OFDM performance is negatively affected, when the codeblock size gets smaller. This may be because in the OTFS case all codeblocks experience the full diversity of the channel across the whole TTI, while in the OFDM case smaller codeblocks occupy a small portion of the time-frequency plane and experience a smaller degree of diversity. In OTFS transmission each QAM symbol in the delay-Doppler plane may experience the same SNR which is equal to the geometric mean of the channel SNR across time and frequency. The foregoing phenomenon may be more pronounced in high Doppler scenarios, for example in the high speed train deployment scenario. FIG. 21 depicts the same results for an EVA-600 channel. The OTFS system has increased diversity gain.

Figures 22A, 22B:
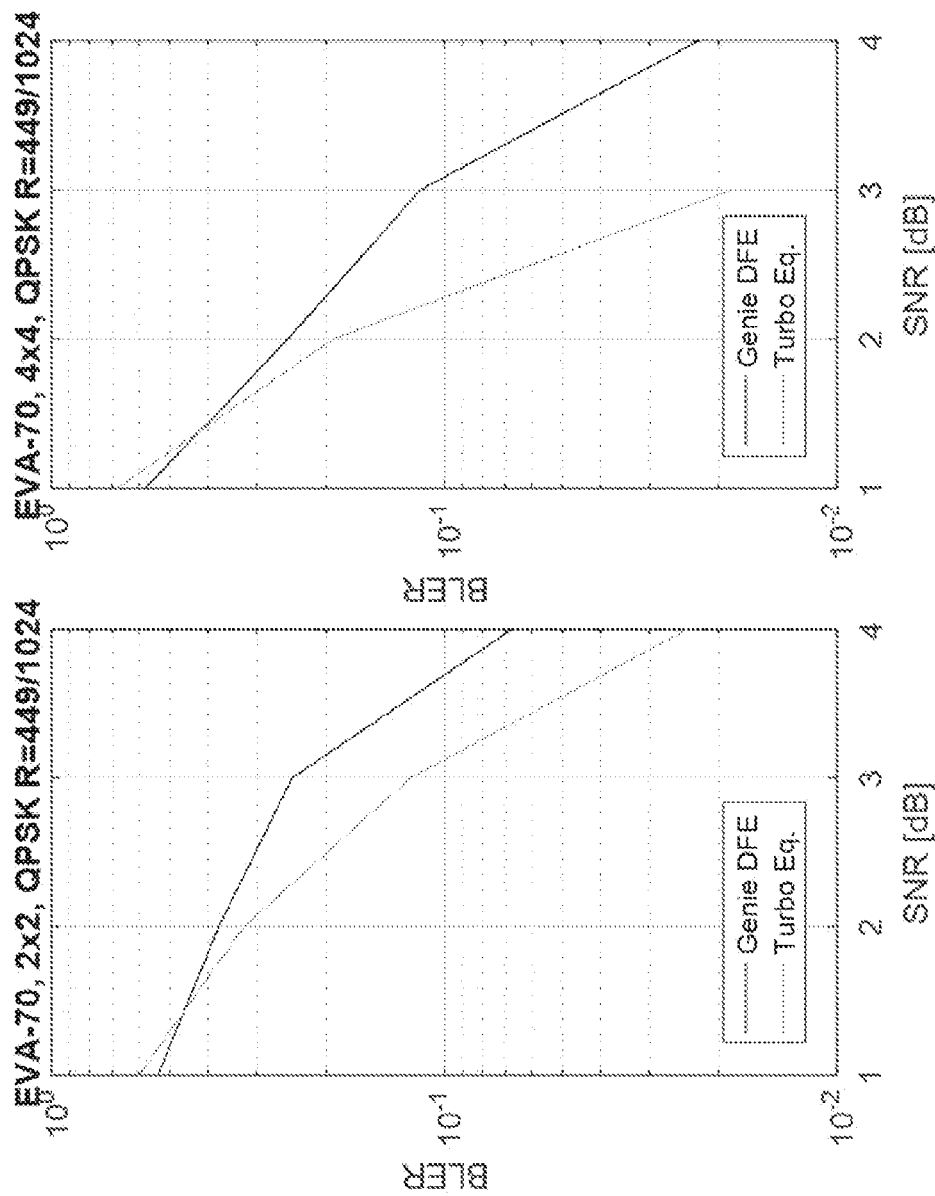
FIG. 22A depicts an example of a BLER for an example DFE and an example turbo equalizer for 2×2 MIMO, in accordance with some example embodiments.
FIG. 22B depicts another example of a BLER for an example DFE and an example turbo equalizer for 4×4 MIMO, in accordance with some example embodiments.

Next, the impact of a genie aided equalizer is compared with a non-genie aided equalizer in FIGS. 22A and 22B. The genie aided DFE (no error propagation) was used for the OTFS system. In FIGS. 22A and 22B, the performance of the genie aided DFE is compared to the non-genie aided frequency domain turbo equalizer for a 2×2 and a 4×4 system. As can be seen in FIGS. 22A and 22B, the turbo equalizer outperforms the genie aided DFE.

Figure 24:
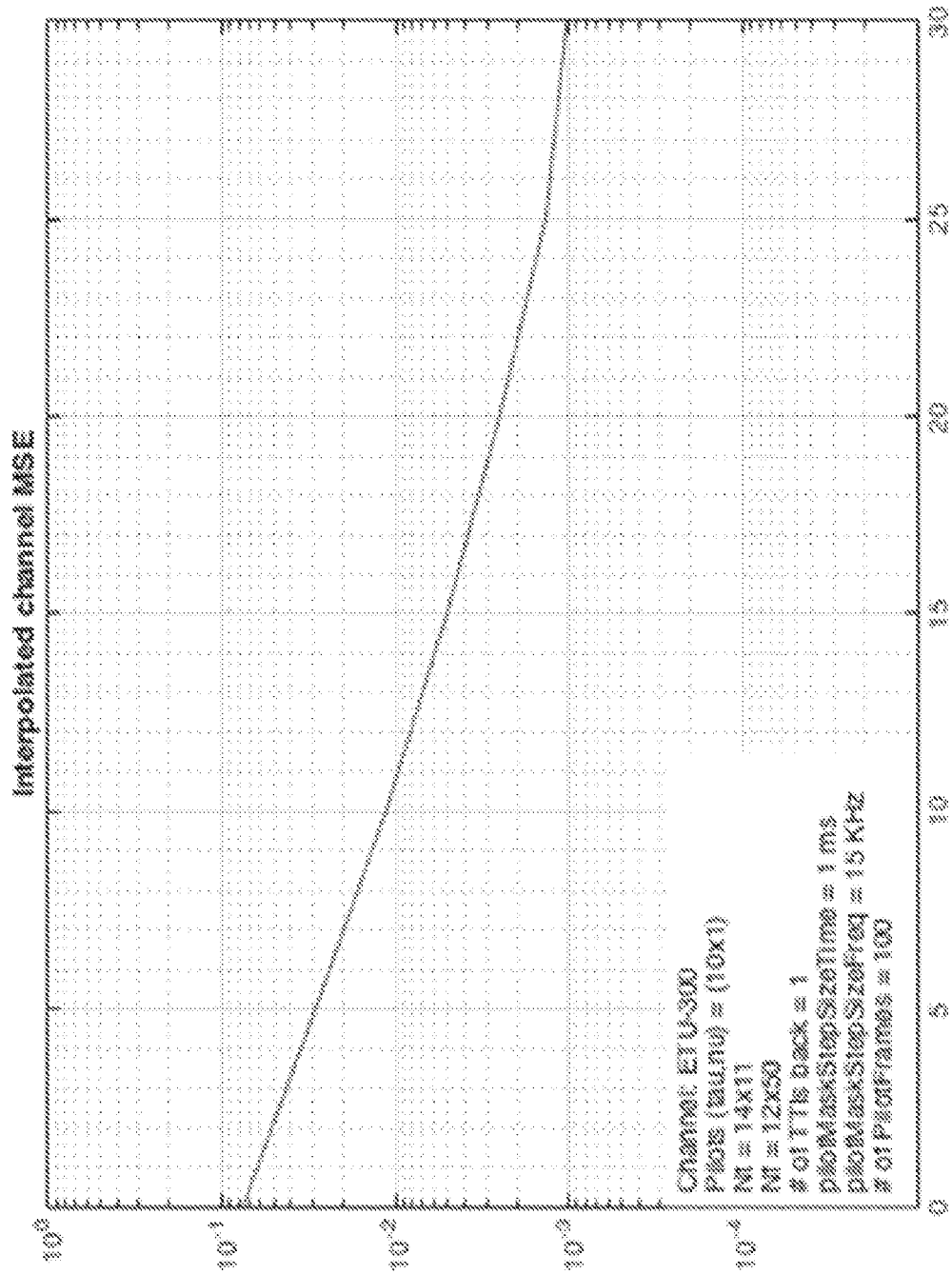
FIG. 24 depicts an example of interpolated channel mean square error (MSE) as a function of channel SNR, in accordance with some example embodiments.

Next a simulation of channel estimation performance. The RSs supporting multiple antenna ports were simulated using the parameters shown in FIG. 23. FIG. 24 shows the MSE performance of the channel estimation of one of the channels after receiving the sum of the 10 RSs, each going through a separate (uncorrelated) channel.

The delay-Doppler domain provides a view of the effects of the wireless channel and points to benefits when modulating information symbols in the delay-Doppler domain. In particular, the wireless fading channel response becomes a two dimensional time invariant convolution response. QAM symbols see the same static channel response throughout the transmission interval and extract the maximum diversity of the channel in both the time and frequency dimensions. Performance improvements are seen for various MIMO configurations in high Doppler scenarios. The delay-Doppler domain is also suitable for designing RS sequences for multiplexing a large number of antenna ports with reduced RS overhead. This can result in significant RS overhead improvements for massive MIMO systems.

Figure 25:
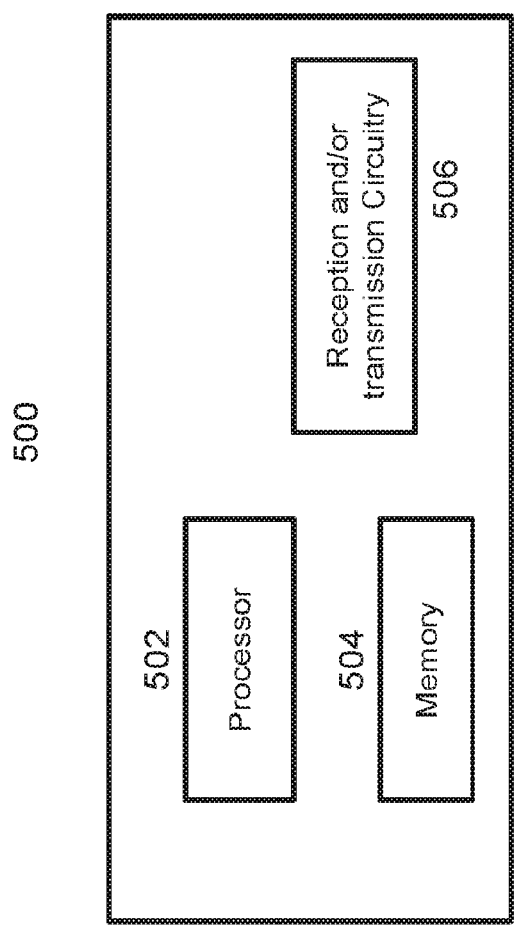
FIG. 25 depicts an example of a wireless transceiver apparatus, in accordance with some example embodiments.

FIG. 25 shows an example of a wireless transceiver apparatus 500. The apparatus 500 may be used to implement method 200. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

It will be appreciated that the disclosed techniques can be used to improve reception performance of wireless apparatus and/or reduce complexity of implementation.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method for receiving an orthogonal time frequency space (OTFS) modulated signal, comprising:

receiving the OTFS modulated signal over a wireless communication channel;

dividing the OTFS modulated signal along a delay-dimension into a plurality of segments;

performing, for each segment, channel estimation to produce a plurality of channel estimates corresponding to the plurality of segments;

performing, for each segment, channel equalization using a corresponding channel estimate from the plurality of channel estimates to generate a channel-equalized symbol stream; and generating information bits from the channel-equalized symbol stream.

2. The wireless communication method of claim 1, wherein each segment has an equal duration in the delay-dimension.

3. The wireless communication method of claim 1, wherein the performing the channel equalization includes performing a minimum mean square error based channel equalization.

4. The wireless communication method of claim 1, wherein the performing the channel equalization includes performing a turbo equalization using information from decoded information bits in an iterative manner.

5. The wireless communication method of claim 1, wherein the generating information bits operation comprises decoding and demapping constellation symbols.

6. The wireless communication method of claim 1, wherein the generating the information bits comprises calculating log-likelihood ratios of the information bits.

7. The wireless communication method of claim 1, where the OTFS modulated signal has Doppler dimension length equal to one, reducing to a single carrier frequency domain multiple access (SC-FDMA) modulated signal.

8. A wireless communication device comprising a memory storing instructions and a processor, wherein the instructions, when executed by the processor, cause the processor to at least:
   receive an orthogonal time frequency space (OTFS) modulated signal over a wireless communication channel;
   divide the OTFS modulated signal along a delay-dimension into a plurality of segments;
   perform, for each segment, channel estimation to produce a plurality of channel estimates corresponding to the plurality of segments;
   perform, for each segment, channel equalization using a corresponding channel estimate from the plurality of channel estimates to generate a channel-equalized symbol stream; and
   generate information bits from the channel-equalized symbol stream.

9. The wireless communication device of claim 8, wherein each segment has an equal duration in the delay-dimension.

10. The wireless communication device of claim 8, wherein the performing the channel equalization includes performing a minimum mean square error based channel equalization.

11. The wireless communication device of claim 8, wherein the performing the channel equalization includes performing a turbo equalization using information from decoded information bits in an iterative manner.

12. The wireless communication device of claim 8, wherein the generating the information bits operation comprises decoding and demapping constellation symbols.

13. The wireless communication device of claim 8, wherein the generating the information bits comprises calculating log-likelihood ratios of the information bits.

14. The wireless communication device of claim 8, where the OTFS modulated signal has Doppler dimension length equal to one, reducing to a single carrier frequency domain multiple access (SC-FDMA) modulated signal.

15. A wireless communication system, comprising:
   a transmitter configured to:
      pre-process, based on a set of basis functions, information bits to generate a plurality of pre-processed symbols,
      modulate, using an orthogonal time frequency space (OTFS) transformation, the plurality of pre-processed symbols to generate an OTFS modulated signal, and
      transmit the OTFS modulated signal over a wireless communication channel; and
   a receiver configured to:
      receive the OTFS modulated signal over the wireless communication channel, divide the OTFS modulated signal along a delay-dimension into a plurality of segments,
      perform, for each segment, channel estimation to produce a plurality of channel estimates corresponding to the plurality of segments,
      perform, for each segment, channel equalization using a corresponding channel estimate from the plurality of channel estimates to generate a channel-equalized symbol stream, and
      generate the information bits from the channel-equalized symbol stream.

16. The wireless communication system of claim 15, wherein the set of basis functions comprise a set of two-dimensional exponential basis functions.

17. The wireless communication system of claim 16, wherein the OTFS transformation comprises a two-dimensional Symplectic discrete Fourier Transform (DFT).

18. The wireless communication system of claim 15, wherein each segment has an equal duration in the delay-dimension.

19. The wireless communication system of claim 15, wherein the generating the information bits operation comprises decoding and demapping constellation symbols.

20. The wireless communication system of claim 15, wherein the generating the information bits comprises calculating log-likelihood ratios of the information bits.

* * * * *